US012710738B2

(12) United States Patent
Letzelter et al.

(10) Patent No.: US 12,710,738 B2
(45) Date of Patent: Aug. 18, 2026

(54) 3D MODELED OBJECT REPRESENTING A MANUFACTURING PRODUCT

(71) Applicant: DASSAULT SYSTEMES, Vélizy-Villacoublay (FR)

(72) Inventors: Frédéric Letzelter, Vélizy-Villacoublay Cedex (FR); Maria Pumborios, Aix-en-Provence (FR); Richard Maisonneuve, Aix-en-Provence (FR)

(73) Assignee: DASSAULT SYSTEMES, Vélizy-villacoublay (FR)

( * ) Notice: Subject to any disclaimer, the term of this patent is extended or adjusted under 35 U.S.C. 154(b) by 484 days.

(21) Appl. No.: 18/358,827

(22) Filed: Jul. 25, 2023

(65) Prior Publication Data

US 2024/0027993 A1 Jan. 25, 2024

(30) Foreign Application Priority Data

Jul. 25, 2022 (EP) .................................... 22306110

(51) Int. Cl.
*G05B 19/4097* (2006.01)
*G06T 7/11* (2017.01)
(Continued)

(52) U.S. Cl.
CPC ............ *G05B 19/4097* (2013.01); *G06T 7/11* (2017.01); *G06T 7/13* (2017.01); *G06T 17/205* (2013.01);
(Continued)

(58) Field of Classification Search
CPC ...... G05B 19/4097; G05B 2219/35134; G06T 7/11; G06T 7/13; G06T 17/205;
(Continued)

(56) References Cited

U.S. PATENT DOCUMENTS 6,222,553 B1 4/2001 DeRose et al.
2007/0247458 A1* 10/2007 Surazhsky .............. G06T 17/20 345/423
(Continued)

FOREIGN PATENT DOCUMENTS

EP 2660782 A1 11/2013

OTHER PUBLICATIONS

Extended European Search Report issued Jan. 4, 2023, in European Patent Application No. 22306110.2, 10 pages.
(Continued)

*Primary Examiner* — Zhipeng Wang
(74) *Attorney, Agent, or Firm* — Oblon, McClelland, Maier & Neustadt, L.L.P.

(57) ABSTRACT

A computer implemented method for designing a 3D modeled object representing a manufacturing product. The method includes obtaining a base mesh representing the 3D modeled object, selecting one or more connected edges of the base mesh, subdividing the base mesh based on the selected edges by obtaining a bevel pattern area over the selected path. The method obtains, for at least one of the two endpoints of the path, a transition area by grouping all faces sharing the at least one of the two endpoints of the path, except those of the computed bevel pattern area. The method re-meshes the transition area by obtaining a transition vertex located in the transition area and computing an edge connecting each vertex of the pair of vertices with the obtained transition vertex. The method outputs the subdivided base mesh. This improves the design of a 3D modeled object.

18 Claims, 18 Drawing Sheets

(51) Int. Cl.
*G06T 7/13* (2017.01)
*G06T 17/20* (2006.01)

(52) U.S. Cl.
CPC .............. *G05B 2219/35134* (2013.01); *G06T 2200/04* (2013.01)

(58) Field of Classification Search
CPC ................. G06T 2200/04; G06T 17/10; G06T 2219/2021; G06T 19/20; G06T 17/20; G06F 30/12; G06F 30/17; G06F 30/20; G06F 30/23
See application file for complete search history.

(56) References Cited

U.S. PATENT DOCUMENTS

2009/0021522 A1* 1/2009 Burley .................... G06T 15/04
345/582
2014/0267268 A1* 9/2014 Tipton .................... G06T 19/20
345/424

OTHER PUBLICATIONS

E. Catmull, J. Clark, "Recursively Generated B-Spline Surfaces On Arbitrary Topological Meshes", 1978 (6 pages).
Tony DeRose, Michael Kass, Tien Truong, "Subdivision Surfaces in Character Animation", 1998 (10 pages).

* cited by examiner

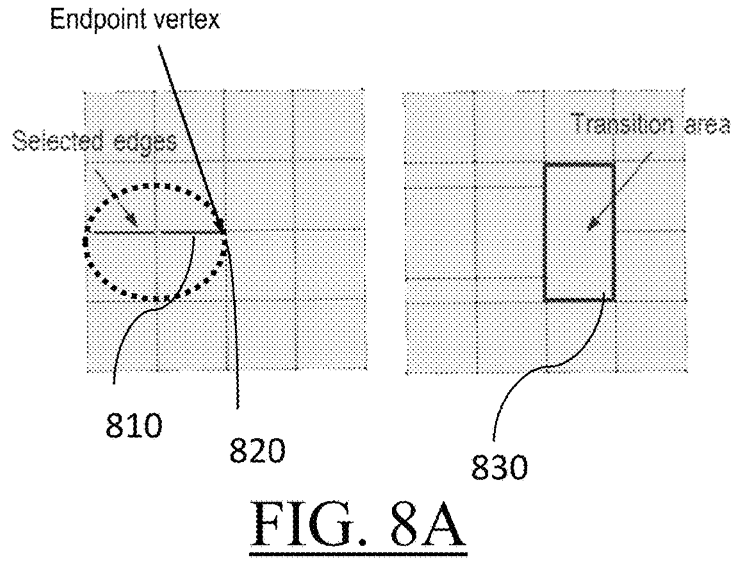
FIG. 8A
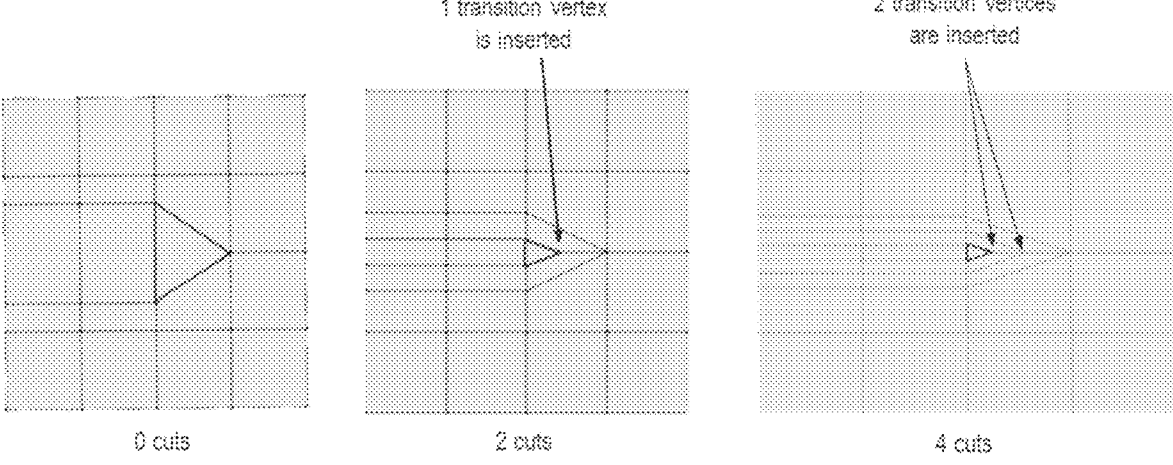
FIG. 8B
1 transition vertex
is inserted
1 cut
3 cuts
FIG. 8C Input

3D MODELED OBJECT REPRESENTING A MANUFACTURING PRODUCT

CROSS-REFERENCE TO RELATED APPLICATIONS

This application claims priority under 35 U.S.C. § 119 or 365 to European Application No. 22306110.2, filed Jul. 25, 2022. The entire contents of the above application are incorporated herein by reference.

TECHNICAL FIELD

The disclosure relates to the field of computer programs and systems, and more specifically to a method, system and program for designing a 3D modeled object representing a manufacturing product.

BACKGROUND

A number of systems and programs are offered on the market for the design, the engineering and the manufacturing of objects. CAD is an acronym for Computer-Aided Design, e.g., it relates to software solutions for designing an object. CAE is an acronym for Computer-Aided Engineering, e.g., it relates to software solutions for simulating the physical behavior of a future product. CAM is an acronym for Computer-Aided Manufacturing, e.g., it relates to software solutions for defining manufacturing processes and operations. In such computer-aided design systems, the graphical user interface plays an important role as regards the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systemes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

The design of 3D modeled objects has been gaining more and more importance. The addition of detail to a 3D modeled object is an important problem in 3D design. On one hand, the detail must capture the design intent. On the other hand, the added detail should not perturb the overall geometry of the 3D modeled object.

CAD solutions makes extensive uses of known technologies for the design of modeled objects: Non Uniform Rational B-Spline surfaces (NURBS in the following) and Subdivision Surfaces. It is noted that it is possible to approximate a subdivision surface by an arrangement of NURBS surfaces, and thus subdivision surface modeling may be used for adding detail and then automatically transforming the resulting subdivision surface into a NURBS surface. In the context of subdivision surface modeling, "bevel" is an operation consisting of densifying the topology of a mesh along a list of edges.

Existing solutions, providing a bevel functionality are limited by the number of edges provided in the bevel (or number of vertices of the profile).

For some of these solutions, a good quality is achieved using bevels comprising two or three inner edges (also called "cuts" in some applications). However, issues arise as soon as the resolution of the bevel becomes higher (that is, the number of cuts is increased) becomes higher, leading to quality issues in the transition area of the bevel. For example, in the software Blender©, the bevel comes to generate a bad mesh at its end, and where the user cannot control the shape. Reference is made to FIG. 1A. FIG. 1A shows a part 100 having a bevel end 10 which is a bad mesh. Indeed, the bevel end 10 is a mesh of low quality, which cannot be controlled or corrected by the user.

Another example can be found on the software CATIA Imagine & Shape©. Reference is made to FIGS. 1B and 1C. First, in FIG. 1B, the transition edges 20 are created depending on some distance criteria, leading to instability in some cases, for instance when the bevel radius is modified. Thus, the resulting shape is quite unpredictable.

Second, in FIG. 1C the shape quality is much altered as triangles 30 lead to geometric aberrations such as curvature defects, while the convergence vertex (where all triangles are converging) is "magnetizing" the light reflections and curvature flow. Visually, this geometric aberration yields a pinch-like surface, leading to the feeling of a bevel that ends with a peak, while the user expectation is a smooth transition between the bevel and the base surface.

FIGS. 1D and 1E also highlight some of the issues for beveling in subdivision modeling. The figures illustrate the use of bevel for create character lines that are fading at their extremities. FIG. 1D shows the geometry, while FIG. 1E shows the highlights, used for verifying the character lines by a designer.

As illustrated in FIG. 1D, the shape 110 does not have a well-adapted topology: the resulting mesh structure does not represent the intent of the designer. Also, as illustrated in FIG. 1E, the highlights calculated on the surface generated on the base mesh are undulating and have an outward flow, which does not respect design intent for character lines.

Within this context, there is still a need for an improved method for designing a 3D modeled object.

SUMMARY

It is therefore provided a computer implemented method for designing a 3D modeled object representing a manufacturing product. The method comprises obtaining a base mesh representing the 3D modeled object. The method also comprises selecting one or more connected edges of the base mesh, thereby obtaining a path of connected edges comprising two endpoints. The method comprises subdividing the base mesh based on the selected edges. The method obtains a bevel pattern area over the selected path by identifying each face of the base mesh that shares an edge of the path. The method subdivides each identified face of the base mesh for reaching a number N of cuts where N is a non-negative number.

The method obtains, for at least one of the two endpoints of the path, a transition area by grouping all faces sharing the at least one of the two endpoints of the path, except those of the computed bevel pattern area.

The method re-meshes the transition area by obtaining, for each cut comprising a pair of vertices, a transition vertex located in the transition area, and computing an edge connecting each vertex of the pair of vertices of the cut with the obtained transition vertex.

The method outputs the subdivided base mesh.

The method may comprise one or more of the following:

the remeshing of the transition area comprises, if the subdividing each identified face of the base mesh comprises subdividing each identified face of the base mesh for reaching an even number 2N of cuts, and if the topology valence of the at least one of the two endpoints of the path is even, performing:

for the N=0 cut, designating one of the vertices connected to the at least one of the two endpoints of the path as a convergence vertex;

for each subsequent cut, obtaining a transition vertex located in the transition area and computing an edge connecting each vertex of the pair of vertices of the subsequent cut with the obtained transition vertex; and keeping unmodified the topology of the other faces of the bevel pattern area and the transition area, thereby obtaining a re-meshed transition area comprising 2N quadrangular faces and a triangular face;

the remeshing of the transition area comprises, if the subdividing each identified face of the base mesh comprises subdividing each identified face of the base mesh for reaching an odd number 2N+1 of cuts, and if the topology valence of the at least one of the two endpoints of the path is even, performing:

for the N=0 cut, designating one of the vertices connected to the at least one of the two endpoints of the path as an convergence vertex;

for each subsequent cut, obtaining a transition vertex located in the transition area and computing an edge connecting each vertex of the pair of vertices of the subsequent cut with the obtained transition vertex; and keeping unmodified the topology of the other faces of the bevel pattern area and the transition area, thereby obtaining a re-meshed transition area comprising 2N quadrangular faces and a triangular face;

the remeshing of the transition area comprises, if the subdividing each identified face of the base mesh comprises subdividing each identified face of the base mesh for reaching an even number 2N of cuts, and if the topology valence of the at least one of the two endpoints of the path is odd, performing:

for the N=0 cut:

identifying a first vertex and a third vertex of the transition area that are connected to the at least one of the two endpoints of the path and a second vertex that is connected to the first and third vertices, the second vertex being a convergence vertex, and obtaining a first transition vertex located in the transition area and computing an edge connecting the generated first transition vertex to the second vertex; and for each subsequent cut, obtaining a transition vertex located in the transition area and computing an edge connecting each vertex of the pair of vertices of the subsequent cut with the obtained transition vertex; and keeping unmodified the topology of the other faces of the bevel pattern area and the transition area, thereby obtaining a re-meshed transition area comprising at least 2*N quadrangular* faces and a triangular face;

the remeshing of the transition area comprises, if the subdividing each identified face of the base mesh comprises subdividing each identified face of the base mesh for reaching an odd number 2N+1 of cuts, and if the topology valence of the at least one of the two endpoints of the path is odd, performing:

for the N=0 cut:

identifying a first vertex and a third vertex of the transition area that are connected to the at least one of the two endpoints of the path and a second vertex that is connected to the first and third vertices, the second vertex being a convergence vertex, and obtaining a first transition vertex located in the transition area and computing an edge connecting the generated first transition vertex to the second vertex; and for each subsequent cut, obtaining a transition vertex located in the transition area and computing an edge connecting each vertex of the pair of vertices of the subsequent cut with the obtained transition vertex; and keeping unmodified the topology of the other faces of the bevel pattern area and the transition area, thereby obtaining a re-meshed transition area comprising at least 2*N quadrangular* faces and a triangular face;

obtaining a transition vertex located in the transition area comprises:

computing a fictive line that extends between:

a fictive vertex located on an edge shared by both the bevel pattern area and the transition area, and a convergence vertex that located on is one of the edges of the transition area;

placing the transition(s) vertex(ices) located on the transition area on the fictive line;

the fictive vertex is constructed as:

an average distance between a pair of vertices of a cut if an even number 2N of cuts is reached; or a location of a middle cut among the cuts if an odd number 2N+1 of cuts is reached.

the placing the transition(s) vertex(ices) located on the transition on the fictive line comprises evenly placing the transition(s) vertex(ices) on the fictive line;

further comprising, for each cut:

constructing the fictive vertex as:

an average distance between the pair of vertices of the cut, or a location of an odd cut with no pair of vertices;

computing a fictive line that extends between the fictive vertex of the cut and the convergence vertex; and placing the transition vertex on the computed fictive line;

the placing, for each cut, the transition vertex on the computed fictive line comprises placing, for each pair (k, N−k−1) of vertices of a cut, the transition vertex (Tk, N−k−1) on the fictive line at a ratio k/(INT(N/2)+1), where INT is an integer part;

the remeshing the transition area further comprises computing a polyline that connects the one or more obtained transition vertices;

the base mesh is a quadrangle base mesh.

It is further provided a computer program comprising instructions which, when the program is executed by a computer, cause the computer to carry out the method.

It is further provided a computer readable storage medium having recorded thereon the computer program.

It is further provided a system comprising a processor communicatively coupled to a memory, the memory having recorded thereon the computer program.

BRIEF DESCRIPTION OF THE DRAWINGS

Non-limiting examples will now be described in reference to the accompanying drawings, where:

FIGS. 4, 5, 6, 7A, 7B, 7C, 8A, 8B, 8C, 9, 10, 11, 12, 13, 14, 15, 16, 17, 18, 19, 20 and 21 illustrate examples of the method.

DETAILED DESCRIPTION

Figure 1A:
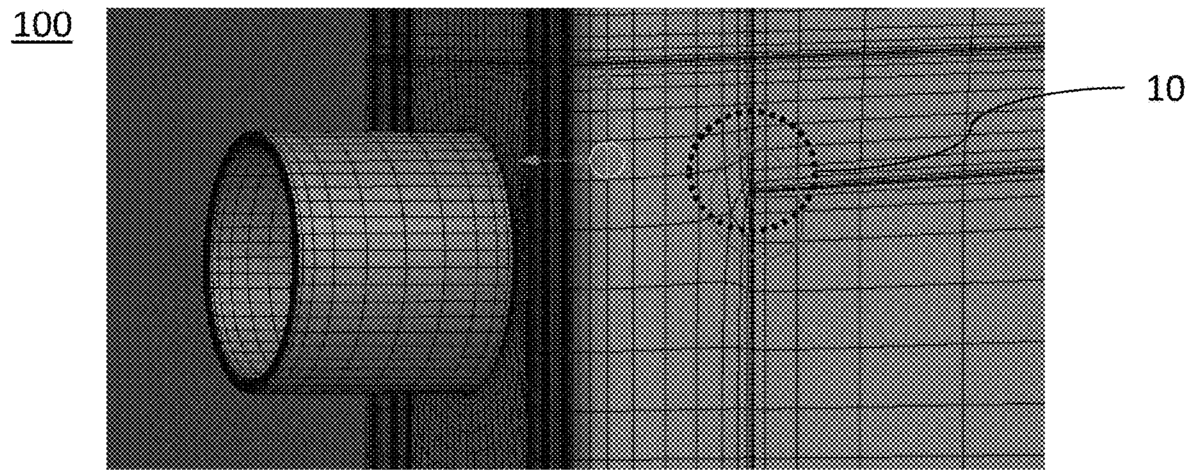
FIGS. 1A, 1B, 1C, 1D, and 1E show examples of the background art.
Figure 1B:
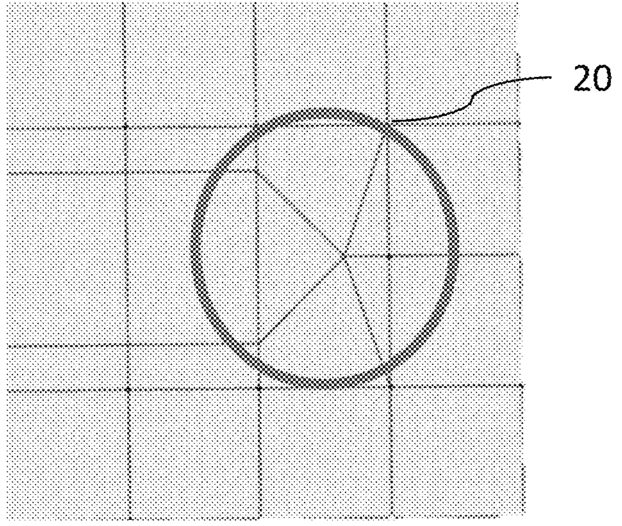
Figure 1C:
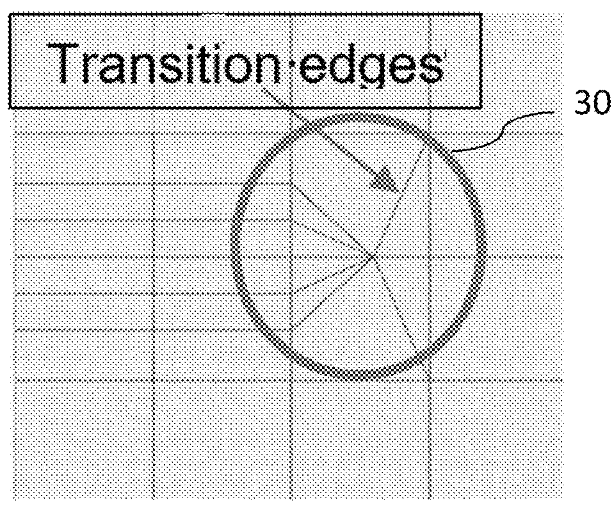
Figures 1D, 1E:
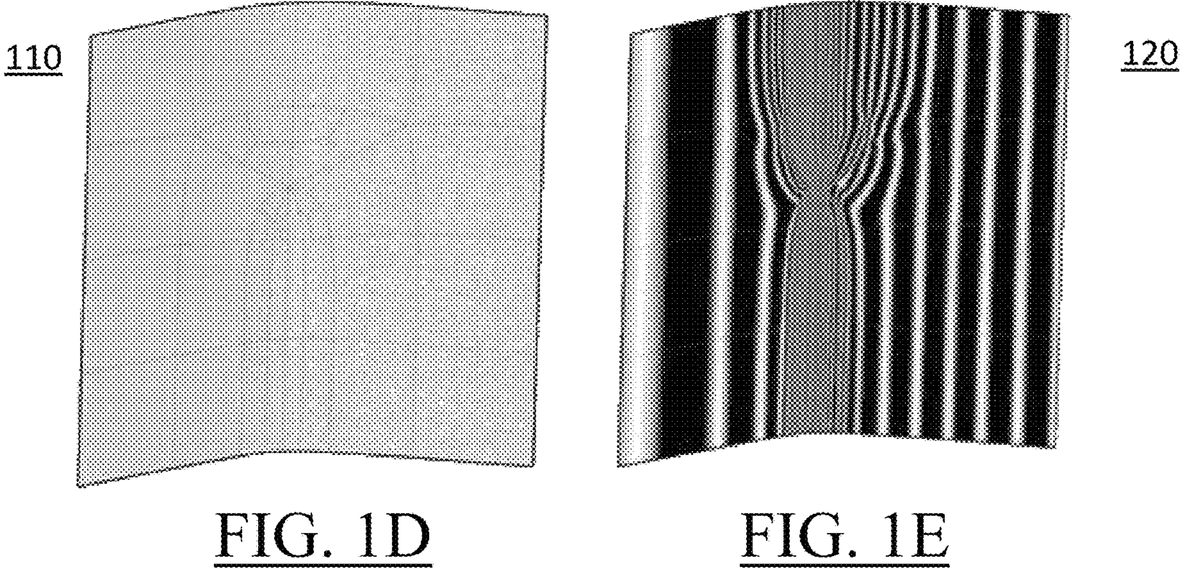
Figure 2:
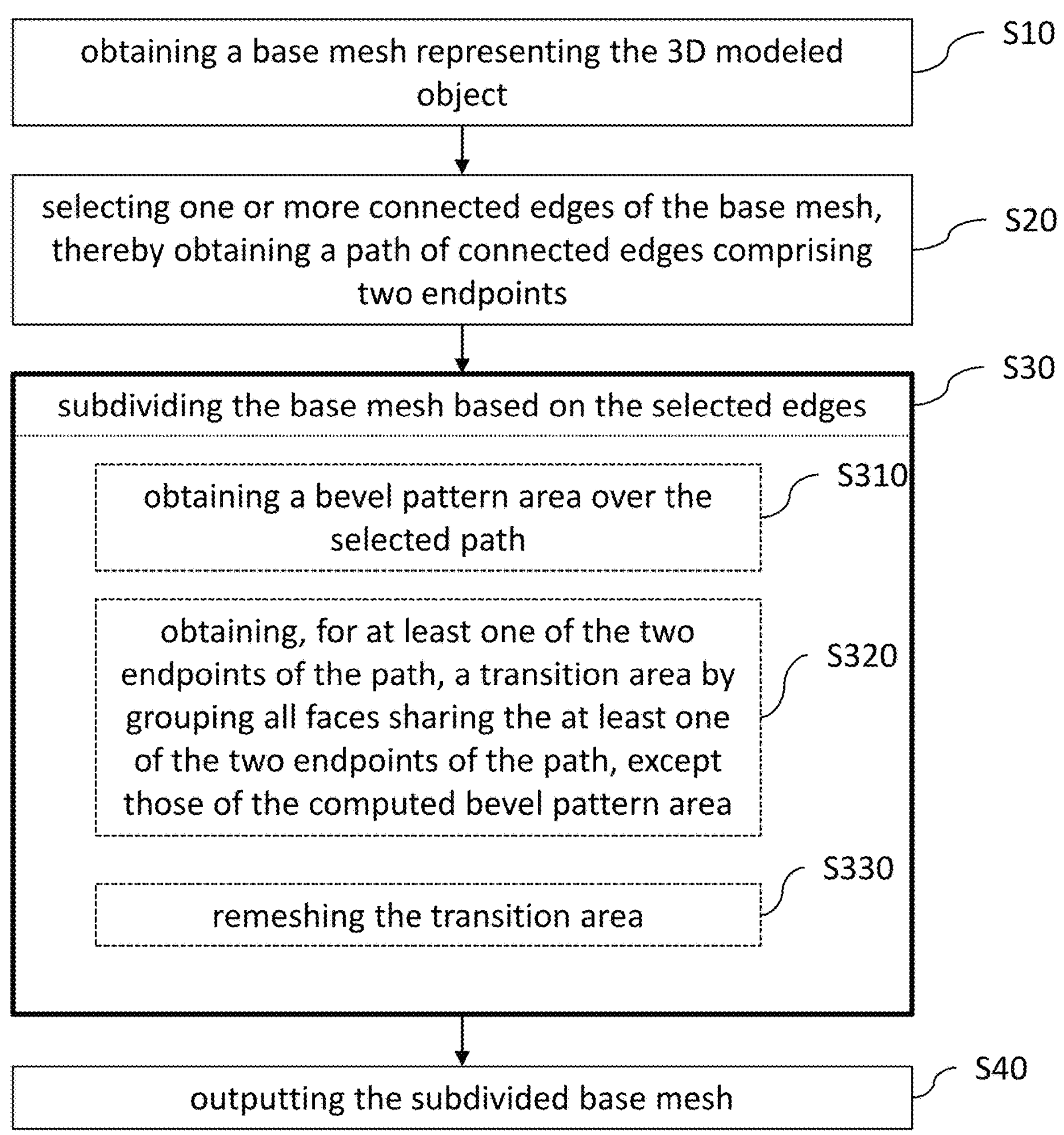
FIG. 2 shows a flowchart of an example of the method.

With reference to the flowchart of FIG. 2, there is described a computer-implemented method for designing a 3D modeled object representing a manufacturing product. The method comprises, obtaining S10 a base mesh representing the 3D modeled object. The method also comprises selecting S20 one or more connected edges of the base mesh, thereby obtaining a path of connected edges comprising two endpoints. The method also comprises subdividing S30 the base mesh based on the selected edges. The subdividing comprises S310, S320 and S330.

The method obtains S310 a bevel pattern area over the selected path. The bevel pattern area is obtained by identifying each face of the base mesh that shares an edge of the path. The method subdivides each identified face of the base mesh for reaching a number N of cuts. N is a non-negative number. N is a positive integer number—the set of integers consists of zero (0), the positive natural numbers (1, 2, 3, . . . )-.

The method obtains S320, for at least one of the two endpoints of the path, a transition area. The method obtains the transition area by grouping all faces sharing the at least one of the two endpoints of the path, except those of the computed bevel pattern area.

The method re-meshes S330 the transition area by obtaining, for each cut comprising a pair of vertices, a transition vertex located in the transition area. The method computes an edge connecting each vertex of the pair of vertices of the cut with the obtained transition vertex.

The method outputs S40 the subdivided base mesh.

Such a method improves the design of the 3D modeled object. Indeed, the method subdivides the mesh based on the selected one or more connected edges of the base mesh, and thus modifies the design of the 3D modeled object (represented by the base mesh) based on the selection. As the method obtains a bevel pattern area over the selected path, the method modifies the design of the base mesh so that the shape of the selected path is consistent with the shape of a bevel, and thus suitable for representing a filet, sweep, pinches or character lines, as known in the field of CAD. In addition, as the method obtains a transition area, and re-meshes the transition area, the method is able to ensure that there exists a continuous transition between the geometry of the bevel pattern area and the rest of the geometry of the 3D modeled object. The method thus modifies the design of the 3D modeled object such that the user is presented with a 3D modeled object that presents the desired bevel shape and that is consistent with the remaining shape of the 3D modeled object, that is, without inducing geometrical aberrations that affect the accuracy of the intended shape.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g., one for the program, and possibly one for the database).

The method generally manipulates modeled objects. A modeled object is any object defined by data stored e.g., in the database. By extension, the expression "modeled object" designates the data itself. According to the type of the system, the modeled objects may be defined by different kinds of data. The system may indeed be any combination of a CAD system, and/or a PLM system. In those different systems, modeled objects are defined by corresponding data. One may accordingly speak of CAD object, PLM object, CAD data, PLM data. However, these systems are not exclusive one of the other, as a modeled object may be defined by data corresponding to any combination of these systems. A system may thus well be both a CAD and PLM system, as will be apparent from the definitions of such systems provided below.

By CAD system, it is additionally meant any system adapted at least for designing a modeled object on the basis of a graphical representation of the modeled object, such as CATIA. In this case, the data defining a modeled object comprise data allowing the representation of the modeled object. A CAD system may for example provide a representation of CAD modeled objects using edges or lines, in certain cases with faces or surfaces. Lines, edges, or surfaces may be represented in various manners, e.g., non-uniform rational B-splines (NURBS). Specifically, a CAD file contains specifications, from which geometry may be generated, which in turn allows for a representation to be generated. Specifications of a modeled object may be stored in a single CAD file or multiple ones. The typical size of a file representing a modeled object in a CAD system is in the range of one Megabyte per part. And a modeled object may typically be an assembly of thousands of parts.

In the context of CAD, a modeled object may typically be a 3D modeled object, e.g., representing a product such as a part or an assembly of parts, or possibly an assembly of products. By "3D modeled object", it is meant any object which is modeled by data allowing its 3D representation. A 3D representation allows the viewing of the part from all angles. For example, a 3D modeled object, when 3D represented, may be handled and turned around any of its axes, or around any axis in the screen on which the representation is displayed. This notably excludes 2D icons, which are not 3D modeled. The display of a 3D representation facilitates design (i.e., increases the speed at which designers statistically accomplish their task). This speeds up the manufacturing process in the industry, as the design of the products is part of the manufacturing process.

The 3D modeled object may represent the geometry of a product to be manufactured in the real world subsequent to the completion of its virtual design with for instance a CAD software solution or CAD system, such as a (e.g., mechanical) part or assembly of parts (or equivalently an assembly of parts, as the assembly of parts may be seen as a part itself from the point of view of the method, or the method may be applied independently to each part of the assembly), or more generally any rigid body assembly (e.g., a mobile mechanism). A CAD software solution allows the design of products in various and unlimited industrial fields, including: aerospace, architecture, construction, consumer goods, high-tech devices, industrial equipment, transportation, marine, and/or offshore oil/gas production or transportation. The 3D modeled object designed by the method may thus represent an industrial product which may be any mechanical part, such as a part of a terrestrial vehicle (including e.g., car and light truck equipment, racing cars, motorcycles, truck and motor equipment, trucks and buses, trains), a part of an aerial vehicle (including e.g., airframe equipment, aerospace equipment, propulsion equipment, defense products, airline equipment, space equipment), a part of a naval vehicle (including e.g., navy equipment, commercial ships, offshore equipment, yachts and workboats, marine equipment), a general mechanical part (including e.g., industrial manufacturing machinery, heavy mobile machinery or equipment, installed equipment, industrial equipment product, fabricated metal product, tire manufacturing product), an electro-mechanical or electronic part (including e.g., consumer electronics, security and/or control and/or instrumentation products, computing and communication equipment, semiconductors, medical devices and equipment), a consumer good (including e.g., furniture, home and garden products, leisure goods, fashion products, hard goods retailers' products, soft goods retailers' products), a packaging (including e.g., food and beverage and tobacco, beauty and personal care, household product packaging).

A CAD system may be history-based. In this case, a modeled object is further defined by data comprising a history of geometrical features. A modeled object may indeed be designed by a physical person (i.e., the designer/user) using standard modeling features (e.g., extrude, revolute, cut, and/or round) and/or standard surfacing features (e.g., sweep, blend, loft, fill, deform, and/or smoothing). Many CAD systems supporting such modeling functions are history-based system. This means that the creation history of design features is typically saved through an acyclic data flow linking the said geometrical features together through input and output links. The history based modeling paradigm is well known since the beginning of the 80's. A modeled object is described by two persistent data representations: history and B-rep (i.e., boundary representation). The B-rep is the result of the computations defined in the history. The shape of the part displayed on the screen of the computer when the modeled object is represented is (e.g., a tessellation of) the B-rep. The history of the part is the design intent. Basically, the history gathers the information on the operations which the modeled object has undergone. The B-rep may be saved together with the history, to make it easier to display complex parts. The history may be saved together with the B-rep in order to allow design changes of the part according to the design intent.

By PLM system, it is additionally meant any system adapted for the management of a modeled object representing a physical manufactured product (or product to be manufactured). In a PLM system, a modeled object is thus defined by data suitable for the manufacturing of a physical object. These may typically be dimension values and/or tolerance values. For a correct manufacturing of an object, it is indeed better to have such values.

Figure 3:
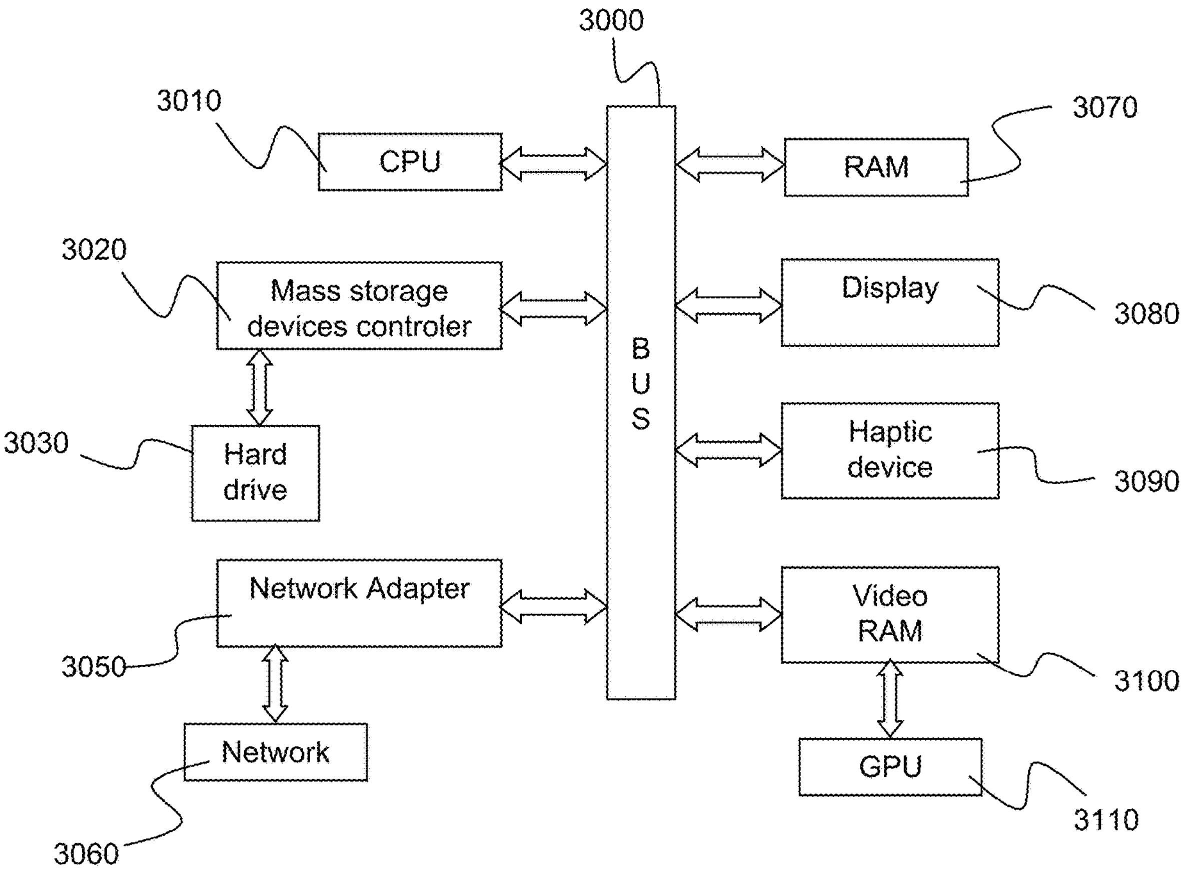
FIG. 3 shows an example of the system.

FIG. 3 shows an example of the system, wherein the system is a client computer system, e.g., a workstation of a user.

The client computer of the example comprises a central processing unit (CPU) 3010 connected to an internal communication BUS 3000, a random access memory (RAM) 3070 also connected to the BUS. The client computer is further provided with a graphical processing unit (GPU) 3110 which is associated with a video random access memory 3100 connected to the BUS. Video RAM 3100 is also known in the art as frame buffer. A mass storage device controller 3020 manages accesses to a mass memory device, such as hard drive 3030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks. Any of the foregoing may be supplemented by, or incorporated in, specially designed ASICs (application-specific integrated circuits). A network adapter 3050 manages accesses to a network 3060. The client computer may also include a haptic device 3090 such as cursor control device, a keyboard or the like. A cursor control device is used in the client computer to permit the user to selectively position a cursor at any desired location on display 3080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program.

Application of the program on the system results in any case in instructions for performing the method. The computer program may alternatively be stored and executed on a server of a cloud computing environment, the server being in communication across a network with one or more clients.

In such a case a processing unit executes the instructions comprised by the program, thereby causing the method to be performed on the cloud computing environment.

"Designing a 3D modeled object" designates any action or series of actions which is at least part of a process of elaborating a 3D modeled object. Thus, the method may comprise creating the 3D modeled object from scratch. Alternatively, the method may comprise obtaining a 3D modeled object previously created, and then modifying the 3D modeled object.

The method may be included in a manufacturing process, which may comprise, after performing the method, producing a physical product corresponding to the modeled object. In any case, the modeled object designed by the method may represent a manufacturing object. The modeled object may thus be a modeled solid (i.e., a modeled object that represents a solid). The manufacturing object may be a product, such as a part, or an assembly of parts. Because the method improves the design of the modeled object, the method also improves the manufacturing of a product and thus increases productivity of the manufacturing process.

By "obtaining", it is meant any type of data acquisition that allows the retrieval or obtention of the base mesh by the method.

Obtaining S10 the base mesh may for example comprise downloading/retrieving (e.g., through a network) said base mesh from a (e.g., distant) memory or server or any non-volatile storage where these data have been stored. Alternatively, the method may obtain the base mesh from a design process, e.g., wherein a user defines (i.e., designs) the base mesh.

The base mesh represents the 3D modeled object. A base mesh is a 3D model that may be used as a starting point for obtaining the 3D modeled object representing a manufacturing product. The designer will work on details and eventually convert the mesh to a higher resolution one, forming a smoother model. In other words, the base mesh comprises at least part of (e.g., all of) the geometrical data defining the spatial distribution of the 3D modeled object. The base mesh designates any graph structure, with vertices (3D positions) and edges (e.g., segments) linking vertices two-by-two and forming so-called faces of the mesh (i.e., smallest cycles of edges).

The faces may be formed from at least three vertices (e.g., more than three, like four). The base mesh may comprise a triangular base mesh. That is, the faces of the triangular base mesh may be formed with three vertices. Additionally and/or alternatively, the base mesh may also comprise a quadrangular base mesh. That is, the faces of the quadrangular base mesh may be formed with four vertices.

The method selects S20 one or more connected edges of the base mesh. By "select", it is meant any action or series of actions which result in distinguishing the one or more connected edges from the rest of the base mesh. The selection may be performed in any manner by a user, e.g., through a graphical user interface adapted for allowing selection by the user on the base mesh, or automatically or semiautomatically through the CAD system "connected", it is meant that at least one of the one or more edges links a common (i.e., the same) vertex.

The selection S20 thereby obtains a path of (the one or more, e.g., one) connected edges comprising two endpoints, i.e., two different vertices sharing at most one of the one or more connected edges (e.g., the same connected edge in the case of only one connected edge).

A path comprises at least a set of connected edges, thereby forming a polyline. The polyline may self-intersect one or more time. The polyline comprises two endpoints, where an endpoint is a point shared with one edge of the set of connected edges. An endpoint typically represents the first point or the last point of the polyline when travelling along the polyline.

The method subdivides S30 the base mesh based on the selected edges. By "subdividing" it is meant any process that replaces a portion of the base mesh (i.e., a set of edges and vertices) by new additional vertices, edges and/or faces. In other words, the subdividing is any process taking the portion of the mesh as input, and outputting a refinement of the existing vertices, edges and/or faces, i.e., with a larger or equal (e.g., strictly larger) number of vertices, edges and/or faces replacing the existing vertices, edges and/or faces.

The subdividing is based on the selected edges. That is, the subdividing is based on the position of the selected edges and/or its shared vertices (e.g., also based on at least one of the endpoints) and may decompose a set of existing faces (that is, of the base mesh) neighboring the selected edges and/or its shared vertices into a new set of faces having new common edges or vertices. By "neighboring" it is meant that the set of existing faces comprises (e.g., consists of) the one or more faces of the base mesh each sharing at least one of the one or more connected edges and/or its shared vertices. The number of faces of the set of existing faces may be set in any manner so as to change the extent of the subdivision based on the selected edges.

The subdividing S30 is now discussed in more details.

The method obtains S310 a bevel pattern area over the selected path. By bevel pattern area it is meant a set of one or more faces swept along the one or more connected edges. The set of one or more faces may form a sloped shape (a so-called "bevel") along the one or more connected edges comprised in the selected path. The bevel pattern area is obtained over the selected path, thus the bevel pattern area is substantially positioned on the position of the connected edges comprised in the selected path.

The obtaining S310 comprises identifying each face of the base mesh that shares an edge of the path of connected edges.

The obtaining S310 also comprises subdividing each identified face of the base mesh for reaching a number N of cuts. A cut is a face subdividing the identified face of the base mesh which is swept along at least one (e.g., all of) of the one or more connected edges sharing the identified face. In other words, at least two (e.g., precisely two) edges of the cut subdivide (or sweep, as known in the field of subdivision modeling) the identified face along the at least one of the one or more connected edges. The number N of cuts is a number of edges of the cuts that sweep the at least one of the one or more connected edges. N is an non-negative integer number; or said otherwise, N is a positive integer number of a set of integers consisting of zero (0), the positive natural numbers (1, 2, 3, . . . ). By convention, when N=0 (i.e., the subdividing performing a 0-cut), the method may subdivide each identified face by one face sweeping along the at least one or more of the connected edges sharing the identified face. Within this convention, a number of cuts N greater than zero means that the face created at N=0 (also called 0-cut face) is subdivided (or partitioned) by faces bounded by N edges sweeping along the face created at N=0. The N edges may be separated by any predetermined distance, this is only a matter of implementation.

The method may subdivide each identified base mesh for reaching a given number (e.g., N) of cuts. By "for reaching", it is meant that, the method performs an iterative subdivision of each identified face, wherein each subdivision may be performed subsequently. By convention, the method may start the iterative process by creating a 0-cut face, that is, the method subdivides for N=0, so that each identified face is subdivided by one face sweeping along the at least one or more of the connected edges sharing the identified face.

The method may continue the iterative subdivision. That is, the cuts are added subsequently, e.g., there exist p values or p-cuts, being ordered positive integer numbers less than N, indicating the subdivision (that is, the creation of a corresponding cut) of the 0-cut face until reaching the number N. For example, p has at least the value p=1 if only one cut is added N=1. In other words, the method subdivides the 0-cut face by two faces bounded by one edge sweeping along the 0-cut face. A second cut is made for p=2; in other words, the method subdivides the 0-cut face by faces bounded by two edges (that is, three faces bounded by the two edges). A third cut is created for p=3, and so on . . . and a Nth cut-face is added for p=N. The method may retain the information on the edges of each cut, for example, the method may retain the information on the edges added on the 0-cut face, for p=1, p=2 and so on. The method may thus identify the edges of the bevel pattern according to said information (e.g., an identifier).

The method obtains S320 for at least one of the two endpoints of the path, a transition area. By "transition area" it is meant a set of faces that creates a geometrical transition between the bevel pattern area and the remaining geometry of the base mesh. The method obtains the transition area by grouping all faces sharing the at least one of the two endpoints of the path, except those of the computed bevel pattern area. By "grouping", it is meant any operation that allows the method to discriminate the faces sharing the at least one of the two endpoints of the path from faces not sharing the at least one of the two endpoints, and the faces of the bevel pattern area sharing an edge at the position of the at least one of the two endpoints.

The method re-meshes S330 the transition area. In other words, the method replaces (or adds or delete) one or more edges of the set of edges and/or vertices of the faces grouped at S320 by new (or additional) edges and/or vertices. The method may thereby modifies the mesh topology of the transition area. The remeshing S330 obtains, for each cut (in the bevel pattern area) comprising a pair of vertices, a transition vertex located in the transition area. By "transition vertex" it is meant a vertex added by the method at a location of the transition area, i.e., not previously comprised in the faces grouped at S320. The transition vertex may be located (by the method) in (that is, within the faces grouped at S320) in any manner, and within any distance with respect to the cut.

The remeshing S330 computes an edge connecting each vertex of the pair of vertices of the cut with the obtained transition vertex. In other words, the method establishes the association of the transition vertex with the pair of vertices of the respective cut by creating a new edge to the transition area that connects the transition vertex via an edge to each respective vertex of the pair of vertices.

The method outputs S40 the subdivided mesh. In other words, the method provides the result of the subdividing at S30, that is, the subdivision of the base mesh. By "outputting" it is meant that the method may perform any kind of data processing so that the subdivided mesh is available for interaction, storage and/or transmittal to a (e.g., distant) memory or server for its posterior treatment or further design.

The method thus improves the design of the 3D modeled object. Indeed, the subdivision of the base mesh maintains the design intent on the selected on or more connected edges, yet by maintaining the geometrical coherence between the subdivision and the remaining geometry of the base mesh. Indeed, the method obtains a bevel pattern area which densifies the topology of the base mesh along the list of edges. The method obtains the transition area so as to ensure that the geometry of the bevel pattern area respects the geometry of the base mesh. This is all thanks to the remeshing, which obtains transitions vertices that connect to the vertices of the cuts (of the bevel), and thus enforce a geometrical coherence (through the computed edges) between the vertices of the cut and the transition area. Thereby, the method outputs a predictable solution (as the method respects design intent), which is very comfortable for the user. Indeed, the user can thus anticipate the result of the design and check its validity and quality in further steps of the design process.

A "topology valence" of a given vertex may be defined as the number of edges connected to the given vertex. Thus, the topology valence is a non-negative number, e.g., being zero if the vertex is not shared by any edge, being an even number or an odd number. In the case where the vertex is at least one of the two endpoints of the path consists of the number of edges connected to said endpoint, including, e.g., at least one edge of the path, and at least one edge of the transition area.

The remeshing S330 of the transition area may comprise, in the event that the subdividing each identified face of the base mesh comprises subdividing each identified face of the base mesh for reaching an even number 2N of cuts, and in the event that the topology valence of the at least one of the two endpoints of the path (of one or more connected edges) is even (that is, the topology valence of said endpoint is a pair number), performing, for the N=0 cut, designating one of the vertices (of the transition area) connected to the at least one of the two endpoints of the path as a convergence vertex.

By designating the one of the vertices as a convergence vertex, it is meant that the method chooses a vertex from the group of faces comprised in the transition area obtained at S320 as a reference for the remeshing S330. The designation may be performed in any manner, by any means, and under any criteria. For example, the method may designate the vertex as the vertex comprised in the transition area having the least distance (e.g., in relative dimensions or via graph distance) to the at least one endpoint, e.g., one of the vertices sharing at most one of the one or more connected edges vertex of the path (also called "endpoint vertex"). Additionally or alternatively, the method may designate the vertex of the transition area based on maximizing an angle consistency with respect to the at least one endpoint. For example, the method may designate the vertex having an angle closest to 180 degrees (up-to some numerical tolerance) with respect to the at least one endpoint. Additionally or alternatively, the method may designate the vertex of the transition area based on the user design intend, where a gesture performed by the user for selecting the edges forming the path may be used for inferring the transition vertex. This is a matter of implementation.

The remeshing S330 may also perform, for each subsequent cut (added in the subdivision), obtaining a transition vertex. The remeshing thus creates a new vertex not previously comprised in the faces grouped at S320 the transition area located in the transition area. The method may obtain the transition vertex in any manner so that it is located in the transition area. For example, the method may take into account the position of the vertices of the subsequent cut and the convergence vertex to position the transition vertex. As the subdividing reaches an even number 2N of cuts, the remeshing S330 obtains N transition vertices.

The remeshing S330 may also compute an edge connecting each vertex of the pair of vertices of the subsequent cut with the obtained transition vertex.

The remeshing S330 may also keep unmodified the topology of the other faces of the bevel pattern area. In other words, the remeshing modifies the topology of the transition area with respect to the obtained transition vertices and respecting the topology (i.e., the connectivity of vertices and edges) of the bevel pattern area.

The remeshing S330 may thereby obtain a re-meshed transition area comprising 2N quadrangular faces and a triangular face. That is, as the subdividing reaches an even number 2N of cuts, and the topology valence is even, the remeshing S330 may take into account the N obtained transition vertices while respecting the even number 2N of vertices of the cuts. Thus, there is one triangular face created from one of the transition vertices (of the N obtained vertices) connecting a pair of cuts of the even number 2N (e.g., the cut added at last on the subdivision, which may be found at the center). The remaining N−1 vertices are connected to the respective subsequent 2N−1 cuts and forming a quadrangular face with respect to the respective cut.

This improves the geometrical consistency between the subdivision of the mesh, comprising the bevel pattern area and the re-meshed transition area with respect to the remaining geometry of the mesh. Indeed, the method takes into account the geometrical disposition of the faces of the bevel pattern (in the form of the even number 2N of cuts) so as to generate a zone (i.e., the transition area) that follows the geometry thereof. As the geometrical consistency is improved, the design of the 3D modeled object is improved. Indeed, thanks to the remeshing, the user is presented with a 3D modeled object that may be better simulated, e.g., with respect to physical inputs.

The remeshing S330 of the transition area may comprise, in the event that the subdividing each identified face of the base mesh comprises subdividing each identified face of the base mesh for reaching an odd number 2N+1 of cuts, and in the event that the topology valence of the at least one of the two endpoints of the path is even, performing for the N=0 cut, designating one of the vertices connected to the at least one of the two endpoints of the path as a convergence vertex. The remeshing S330 performs the designating by using the same principles above.

The remeshing S330 may also perform for each subsequent cut, obtaining a transition vertex located in the transition area. The remeshing may obtain the transition vertex by the same principles described above (in reference to an even number 2N of cuts is reached).

The remeshing S330 may also compute an edge connecting each vertex of the pair of vertices of the subsequent cut with the obtained transition vertex. The remeshing S330 may keep keeping unmodified the topology of the other faces of the bevel pattern area and the transition area.

The remeshing S330 may perform the abovementioned steps according to the principles described above. The remeshing S330 may thereby obtain a re-meshed transition area comprising 2N quadrangular faces and a triangular face. As there are 2N+1 number of cuts, and the remeshing obtains, for each subsequent cut, a transition vertex, there is a cut of the bevel pattern area which is not connected to a transition vertex. Thus, there is one triangular face created from one of the transition vertices (of the N obtained vertices) connecting a pair of cuts (of the odd number 2N+1 of cuts) of the even number 2N (e.g., the cut added at last on the subdivision, which may be found at the center). The remaining N−1 vertices are connected to the respective subsequent 2N−1 cuts and forming a quadrangular face with respect to the respective cut.

This improves the geometrical consistency between the subdivision of the mesh, comprising the bevel pattern area and the re-meshed transition area with respect to the remaining geometry of the mesh. Indeed, the method takes into account the geometrical disposition of the faces of the bevel pattern (in the form of the odd number 2N+1 of cuts) so as to generate a zone (i.e., the transition area) that follows the geometry thereof. As the geometrical consistency is improved, the design of the 3D modeled object is improved. Indeed, thanks to the remeshing, the user is presented with a 3D modeled object that may be better simulated, e.g., with respect to physical inputs.

The remeshing S330 of the transition area may comprise, in the event that the subdividing each identified face of the base mesh comprises subdividing each identified face of the base mesh for reaching an even number 2N of cuts, and in the event that the topology valence of the at least one of the two endpoints of the path is odd, performing, for the N=0 cut, identifying a first vertex and a third vertex of the transition area. The first vertex and the third vertex may be any vertex comprised in the transition area obtained at S320, e.g., at a boundary of the transition area or in its interior. The first vertex and the third vertex are connected to the at least one of the two endpoints of the path and thus sharing a link with the at least one of the two endpoints. The remeshing S330 may also identify a second vertex. The second vertex may be connected to the first and third vertices (e.g., through at least one edge). The second vertex may be a convergence vertex. In other words, the method may designate the second vertex as the convergence vertex.

The remeshing S330 may also perform, for the N=0 cut, obtaining a first transition vertex. The first transition vertex may be obtained from the same principles described above. The first transition vertex may be located in the transition area. The remeshing S330 may also perform, still for the N=0 cut, computing an edge. The edge may connect the generated first transition vertex to the second vertex.

The remeshing S330 may also perform, for each subsequent cut, obtaining a transition vertex located in the transition area. The remeshing S330 may also compute an edge connecting each vertex of the pair of vertices of the subsequent cut with the obtained transition vertex.

The remeshing S330 may also perform, for the subsequent cut, keeping unmodified the topology of the other faces of the bevel pattern area and the transition area. The remeshing S330 may thereby obtain a re-meshed transition area comprising at least 2N quadrangular faces and a triangular face. That is, the method does not comprise less than 2N quadrangular faces and a triangular face, and may add further faces to maintain the remeshing consistent, this is only a matter of implementation.

This improves the geometrical consistency between the subdivision of the mesh, comprising the bevel pattern area and the re-meshed transition area with respect to the remaining geometry of the mesh. Indeed, the method takes into account the geometrical disposition of the faces of the bevel pattern (in the form of the even number 2N of cuts and the topology valence being odd) so as to generate a zone (i.e., the transition area) that follows the geometry thereof. As the geometrical consistency is improved, the design of the 3D modeled object is improved. Indeed, thanks to the remeshing, the user is presented with a 3D modeled object that may be better simulated, e.g., with respect to physical inputs.

The remeshing S330 of the transition area may comprise, in the event that the subdividing each identified face of the base mesh comprises subdividing each identified face of the base mesh for reaching an odd number 2N+1 of cuts, and in the event that the topology valence of the at least one of the two endpoints of the path is odd, performing, for the N=0 cut, identifying a first vertex and a third vertex of the transition area that are connected to the at least one of the two endpoints of the path and a second vertex that is connected to the first and third vertices, the second vertex being a convergence vertex.

The remeshing S330 may also obtain, for the N=0 cut, a first transition vertex located in the transition area and computing an edge connecting the generated first transition vertex to the second vertex.

The remeshing S330 may obtain, for each subsequent cut, obtaining a transition vertex located in the transition area and computing an edge connecting each vertex of the pair of vertices of the subsequent cut with the obtained transition vertex.

The remeshing S330 may also keep unmodified, for the subsequent cut, the topology of the other faces of the bevel pattern area and the transition area. The remeshing S330 thereby obtains a re-meshed transition area comprising at least 2N quadrangular faces and a triangular face. That is, the method does not comprise less than 2N quadrangular faces and a triangular face, and may add further faces to maintain the remeshing consistent.

This improves the geometrical consistency between the subdivision of the mesh, comprising the bevel pattern area and the re-meshed transition area with respect to the remaining geometry of the mesh. Indeed, the method takes into account the geometrical disposition of the faces of the bevel pattern (in the form of the odd number 2N+1 of cuts and the topology valence being odd) so as to generate a zone (i.e., the transition area) that follows the geometry thereof. As the geometrical consistency is improved, the design of the 3D modeled object is improved. Indeed, thanks to the remeshing, the user is presented with a 3D modeled object that may be better simulated, e.g., with respect to physical inputs.

Obtaining a transition vertex located in the transition area may comprises computing a fictive line. By "fictive line", it is meant any theoretical line that may be computed by the method. In other words, the fictive line is used by the method, but not directly applied to the remeshing or the outputting.

The fictive line may extend (its dimensions such as length) between a fictive vertex and a convergence vertex. The fictive vertex is a theoretical point, similar as the fictive line. The fictive vertex may be located (e.g., by the method) on an edge shared by both the bevel pattern area and the transition area. The convergence vertex may be located on one of the edges of the transition area. The convergence vertex may be, for example, if the subdividing each identified face of the base mesh comprises subdividing each identified face of the base mesh for reaching an even number 2N of cuts and if the topology valence of the at least one of the two endpoints of the path is even, the designated one of the vertices connected to the at least one of the two endpoints of the path, for the N=0 cut.

The convergence vertex may be, in another example, if the subdividing each identified face of the base mesh comprises subdividing each identified face of the base mesh for reaching an odd number 2N+1 of cuts and if the topology valence of the at least one of the two endpoints of the path is even, the designated one of the vertices connected to the at least one of the two endpoints of the path, for the N=0 cut.

The convergence vertex may be, in another example, if the subdividing each identified face of the base mesh comprises subdividing each identified face of the base mesh for reaching an even number 2N of cuts and if the topology valence of the at least one of the two endpoints of the path is odd, the identified second vertex that is connected to the first and third vertices identified on the transition area that are connected to the at least one of the two endpoints of the path, for the N=0 cut.

The convergence vertex may be, in another example, if the subdividing each identified face of the base mesh comprises subdividing each identified face of the base mesh for reaching an odd number 2N+1 of cuts and if the topology valence of the at least one of the two endpoints of the path is odd, the identified second vertex the identified second vertex that is connected to the first and third vertices identified on the transition area that are connected to the at least one of the two endpoints of the path, for the N=0 cut.

The method may place the transition(s) vertex(ices) located on the transition area on the fictive line. That is, the method takes int account, for the remeshing at S330, the extension of the fictive line (and the respective cuts), to place the transition vertices.

This yet improves the geometrical accuracy. Indeed, the method avoids geometric aberrations between the bevel pattern area and the remaining geometry of the mesh. This is all thanks to the positioning of the vertices along the fictive line. Indeed, the fictive line dictates the overall direction for maintaining the consistency of the transition area with respect to the remaining geometry of the mesh. Thus, the user is presented with a modeled object that presents accurately the intended design.

The fictive vertex may be constructed as an average distance between a pair of vertices of a cut if an even number 2N of cuts is reached. In other words, the method may create the fictive vertex at a position corresponding to the average distance. Alternatively, the fictive vertex may be constructed as a location of a middle cut among the cuts if an odd number 2N+1 of cuts is reached. For example, if the cuts are evenly spaced in the bevel pattern area, the method may construct the fictive vertex at the position of the middle cut.

The method thus allows to maintain geometrical coherence depending on the number of cuts. In the case where the cuts are even, the method looks for setting an average direction of the line extending along the middle area of the cut, whereas the method sets the direction along the geometrical middle (in the form of the location of the middle cut) in the case where the number of cuts is odd. As the method is able to adapt the transition area to the two cases of the number of cuts, the geometrical coherence is indeed maintained.

The placing the transition(s) vertex(ices) located on the transition on the fictive line may comprise evenly placing the transition vertex (respectively transition vertices) on the fictive line. For example, the method may comprise taking the dimension of the fictive line into account to homogenize the placement of the transition vertices.

This results in that the method obtains a regular shape, in which the faces are homogeneously spaced. This achieves a good tradeoff between accuracy and smoothness of the remeshing. Indeed, thanks to the placement of the transition vertices, the method ensures a clean curvature transition between the incident faces of the bevel and the main shape body.

The method may further comprise, for each cut, constructing the fictive vertex as an average distance between the pair of vertices of the cut. For example, the method may set weights to each vertex of the pair for computing the average distance. Alternatively, the method may construct the fictive vertex as a location of an odd cut with no pair of vertices. That is, the method may choose any location of the odd cut sharing no pair of vertices. The method may also compute a fictive line that extends between the fictive vertex of the cut and the convergence vertex. The method may also place the transition vertex on the computed fictive line.

The method thus decouples the setting of the fictive vertex corresponding to the type of cut. Thus, the method improves the flexibility of the creation of the transition area.

The method may place, for each cut (assuming the number of cuts is N− which may be odd or even), the transition vertex on the computed fictive line comprises placing, for each pair (k, N−k−1) of vertices of a cut, where 0<k<N, the transition vertex ($T_{k, N-k-1}$) on the fictive line. The transition vertex may be placed at a ratio (position) k/(INT(N/2)+1), where INT(X) is (corresponds to) an integer part (of the number X).

The method thus places the transition vertices homogeneously according to the ratio, thereby achieving an homogeneous (and smooth) transition area.

The remeshing S330 of the transition area may further comprise computing a polyline. By polyline it is meant a set of interconnected edges. The polyline may connect the one or more obtained transition vertices. In other words, the connections between the edges of the polyline correspond to the one or more transition vertices.

This results in a "dividing shape" which divides the transition area along the one or more transition vertices. It has been appreciated that the dividing shape serves as a region of attraction which maintains the geometry smooth, and without having geometrical aberrations (as the remeshing may add depth to the polyline, as known from subdivision modelling).

Examples are now discussed with reference to FIGS. 4 to 21.

Some aspects of subdivision modeling are now discussed.

In the context of subdivision modeling, Bevel is the operation consisting in densifying the topology of a Subdivision Base Mesh along a list of edges.

The densification induces a local attraction for a given shape, in the area of the bevel. The bevel may be used form designing fillets, or sweeps, pinches or character lines (also called feature lines, or fading edges).

Figure 4:
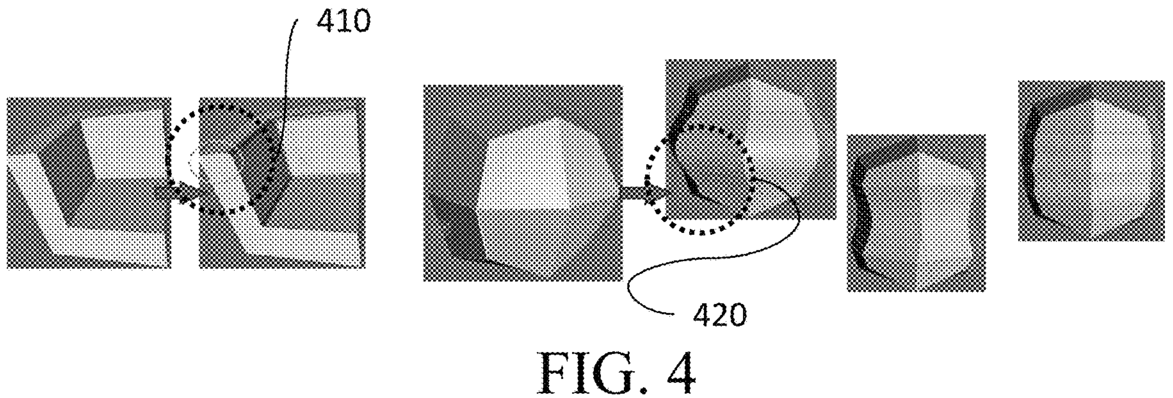

FIG. 4 illustrates the use of bevel for designing fillets a fillet 410 or a sweep 420.

Figure 5:
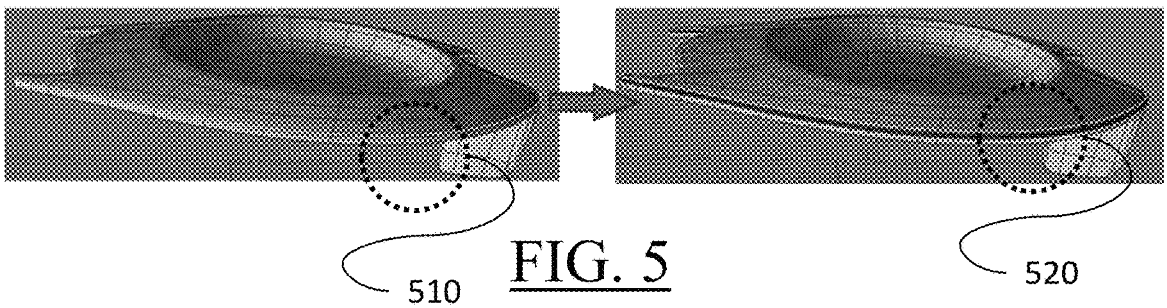

FIG. 5 illustrates the use of bevel for designing pinches on a modeled object. The bevel operator adds a bevel 510, on a border 510 of the modeled object.

Figure 6:
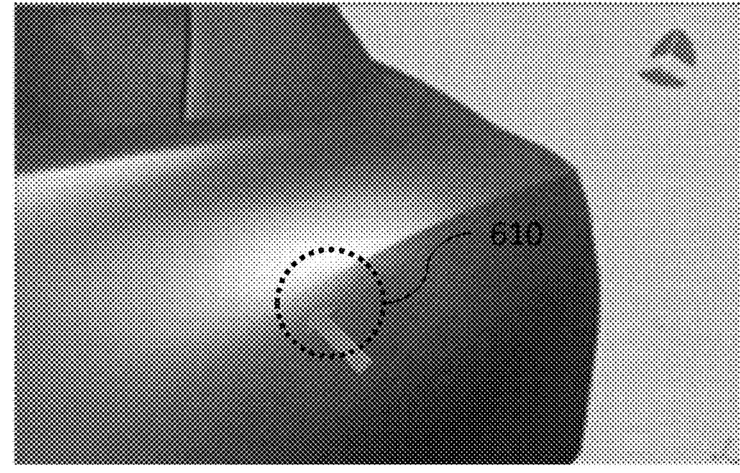

FIG. 6 illustrates a screenshot of a character line 610.

As mentioned above, a bevel, also called "subdivision bevel", is a feature used to locally densify a base mesh's topology along a set of connected edges.

Figure 7A:
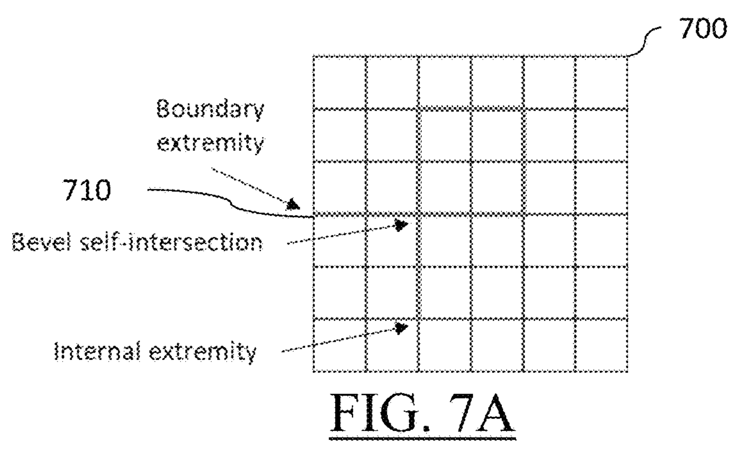
Figure 7B:
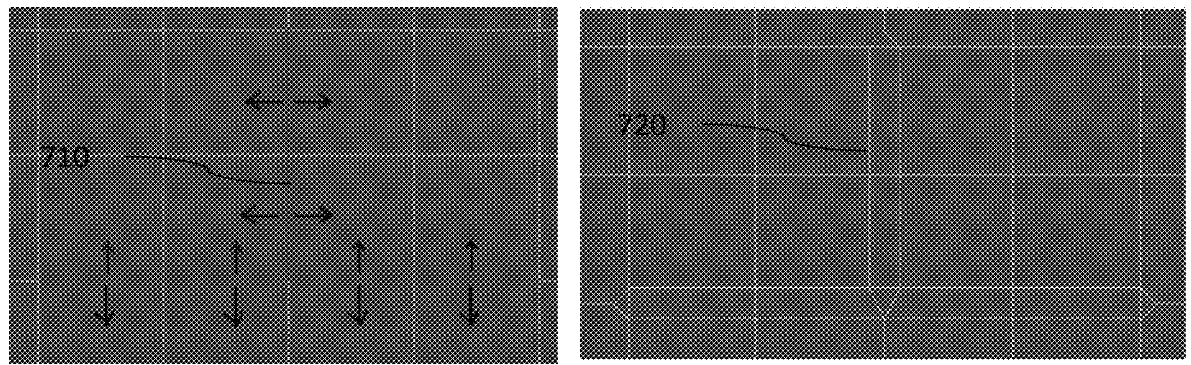

FIG. 7A to BC illustrates the inputs for the bevel feature/operation:

- A subdivision base mesh 700 with quadrangular or triangular faces;
- A set of distinct connected edges 710 describing an edge path (possibly self-intersecting at vertices);
- A pattern 720 that will be swept along the initial edges. The complexity of the pattern defines the number of "cuts" (internal degree of freedom to describe the polyline representing the curve, the number of cuts is greater or equal to 0).

Figure 7C:
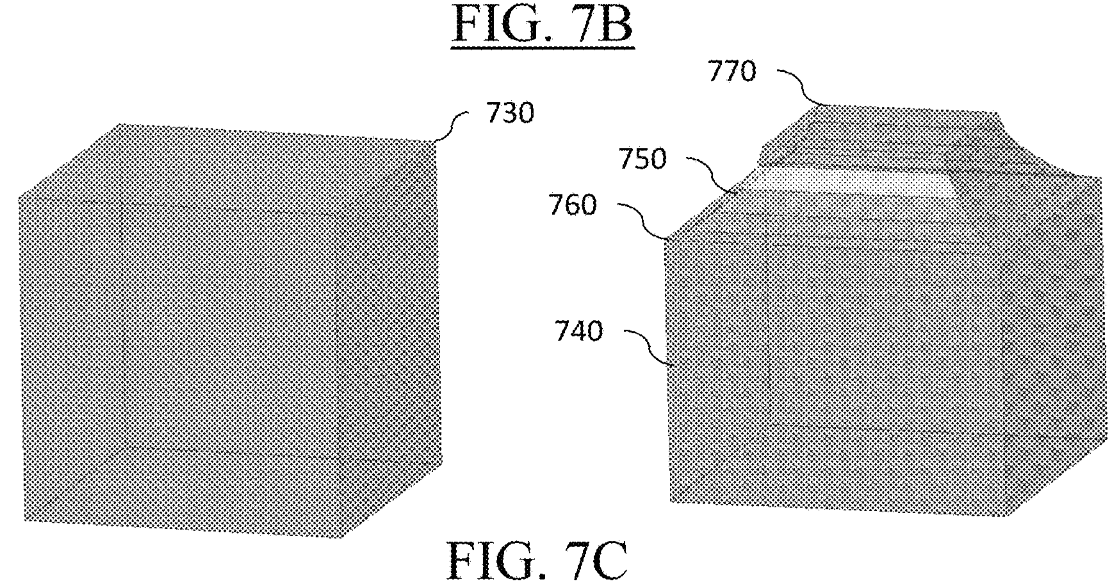

FIG. 7C illustrates a base mesh 730 and a topology of a bevel 740 (resulting from the base mesh upon application of the bevel operation) with four cuts concave pattern.

- Interior part 750: the topology is well known, input edges are replaced by more edges and faces.
- Intersection parts 760: a fill technology can be used to create the appropriate topology, this topic is not addressed here.
- Extremity part 770: no topology is created when the bevel stops on a boundary, the only case to consider is when the bevel ends on an internal vertex.

Faces around the end vertex are removed and this transition area is re-meshed so that flows (or mesh lines) stay natural and keep the designer intent.

The implementation may be explained in three steps: 1) end topology for regular vertices, 2) end topology for extraordinary vertices, and 3) location of transition vertices.

1) End Topology for Regular Vertices.

As a reminder, internal vertices at the intersection of 4 exactly edges are said to be regular.

FIG. 8A shows the basic principle of the method. The method receives the same input as the bevel operator, e.g., the base mesh and selected edges 810 with endpoint vertex 820. The method outputs a bevel and a transition area 820. In the method, the generated topology (of the bevel and the transition area) will be slightly different depending on the parity of the number of cuts of the bevel.

FIG. 8A shows the topology for an even number of cuts for the case of regular vertices: an even number of cuts 2N generates N transition vertices (N−1 are regular), 2N+2 quadrangular faces and 1 triangular face.

FIG. 8B illustrates the topology for an odd number of cuts for the case of regular vertices: an odd number of cuts 2N+1 will generate: N transition vertices (N−1 are regular), 2N+3 quadrangular faces.

2) End Topology for Internal Extraordinary Vertices.

In this more generic situation the topology will depend on the parity of the number of cuts and the vertex valence, but the behavior will be similar to the one with regular vertices.

2.1. Topology for an Even Valence Vertex.

Figure 9:
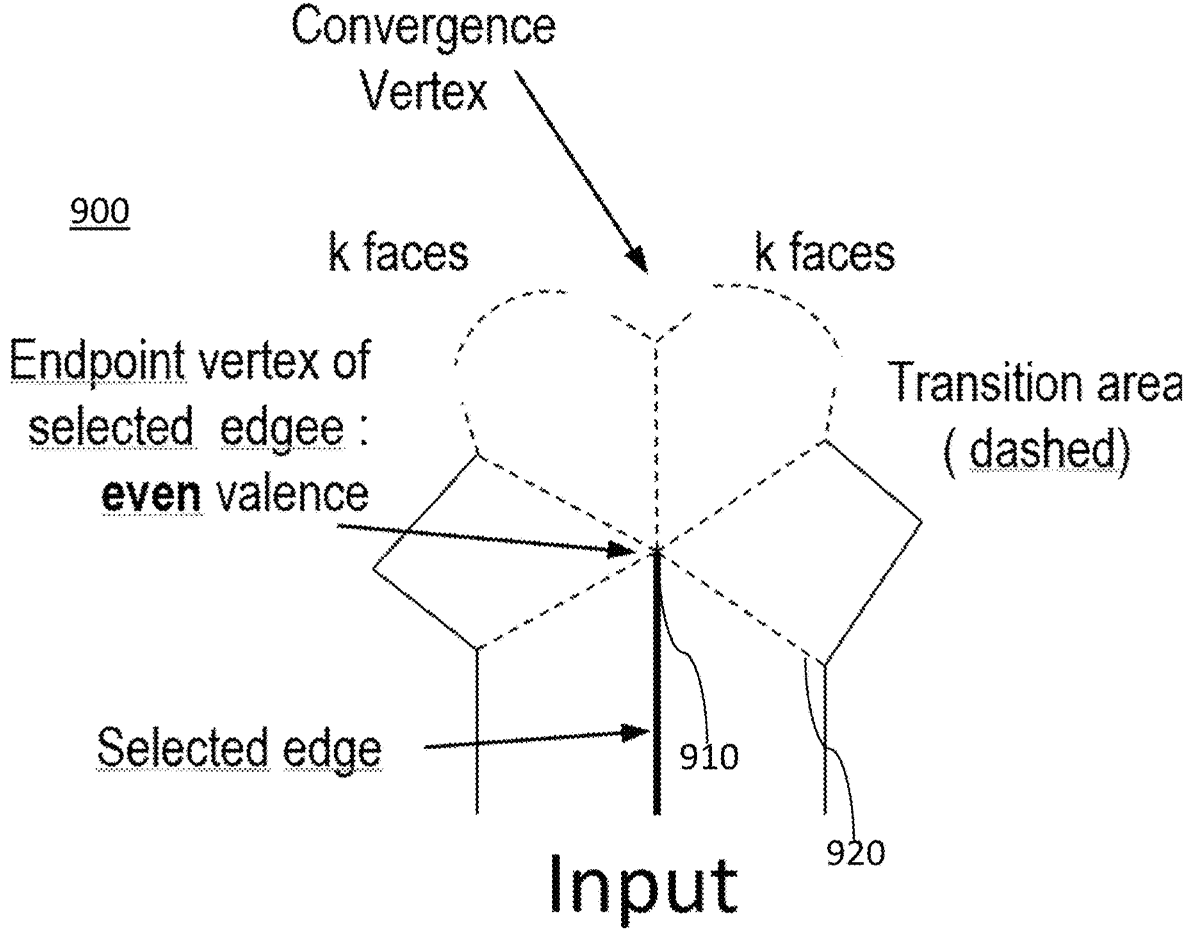

FIG. 9 illustrates an input configuration 900. The input configuration illustrates a vertex 910 consisting of an endpoint of the selected edges (to which the bevel will be applied). FIG. 9 shows the input topology of the vertex of 910 (of even valence): The example of FIG. 9 illustrates the case of an even number of faces around the vertex 910: 2 faces sharing the last edge of the bevel, and 2*k other faces in the transition area 920.

Figure 10:
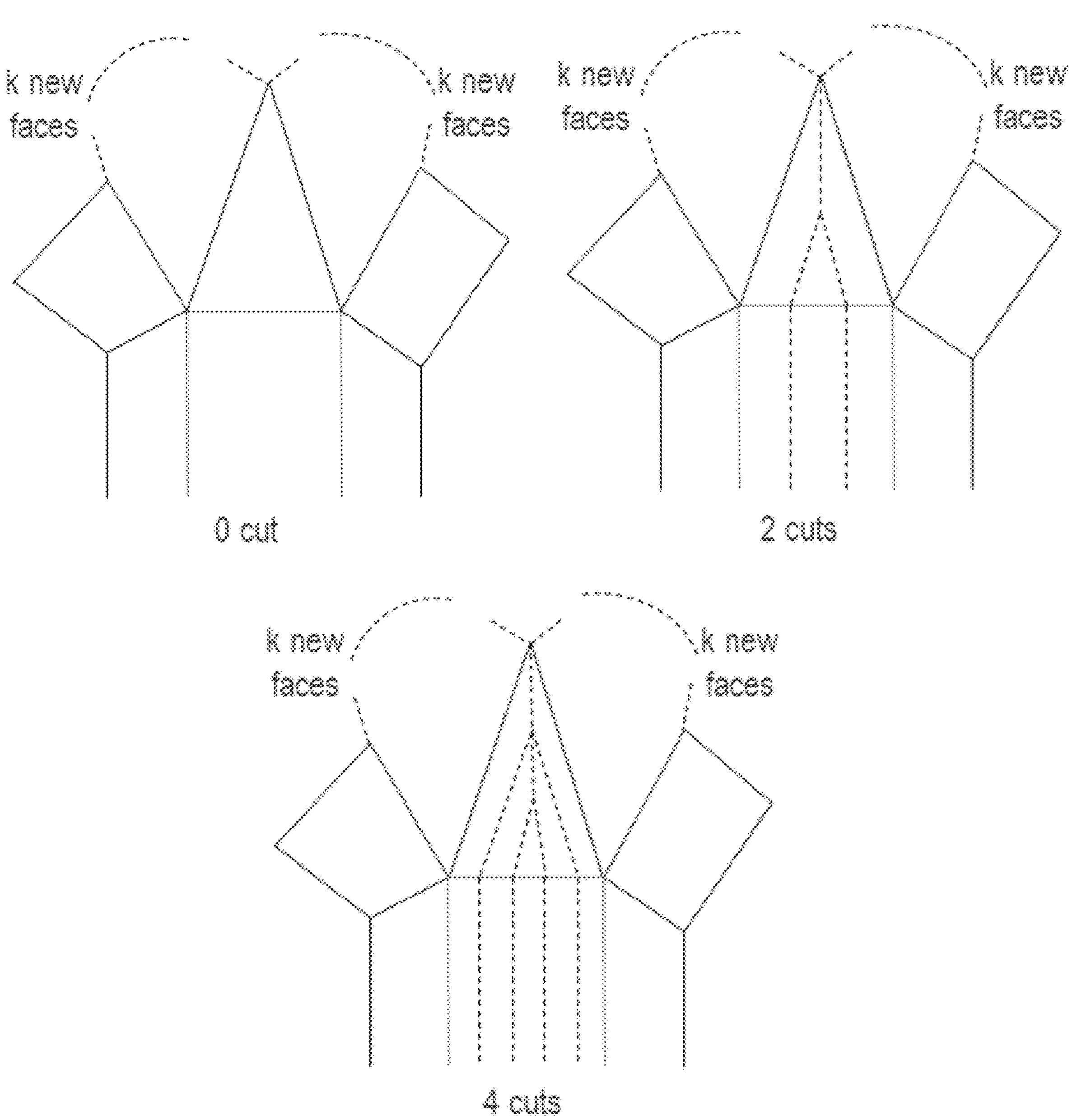

FIG. 10 illustrates the output topology for an even valence vertex and even number of cuts. The method applies the same pattern as for the case of regular vertices. As can be seen from FIG. 10, An even number of cuts 2N generates N transition vertices (N−1 of which are regular), 2N quadrangular faces and 1 triangular face. The topology of other faces is unchanged.

Figure 11:
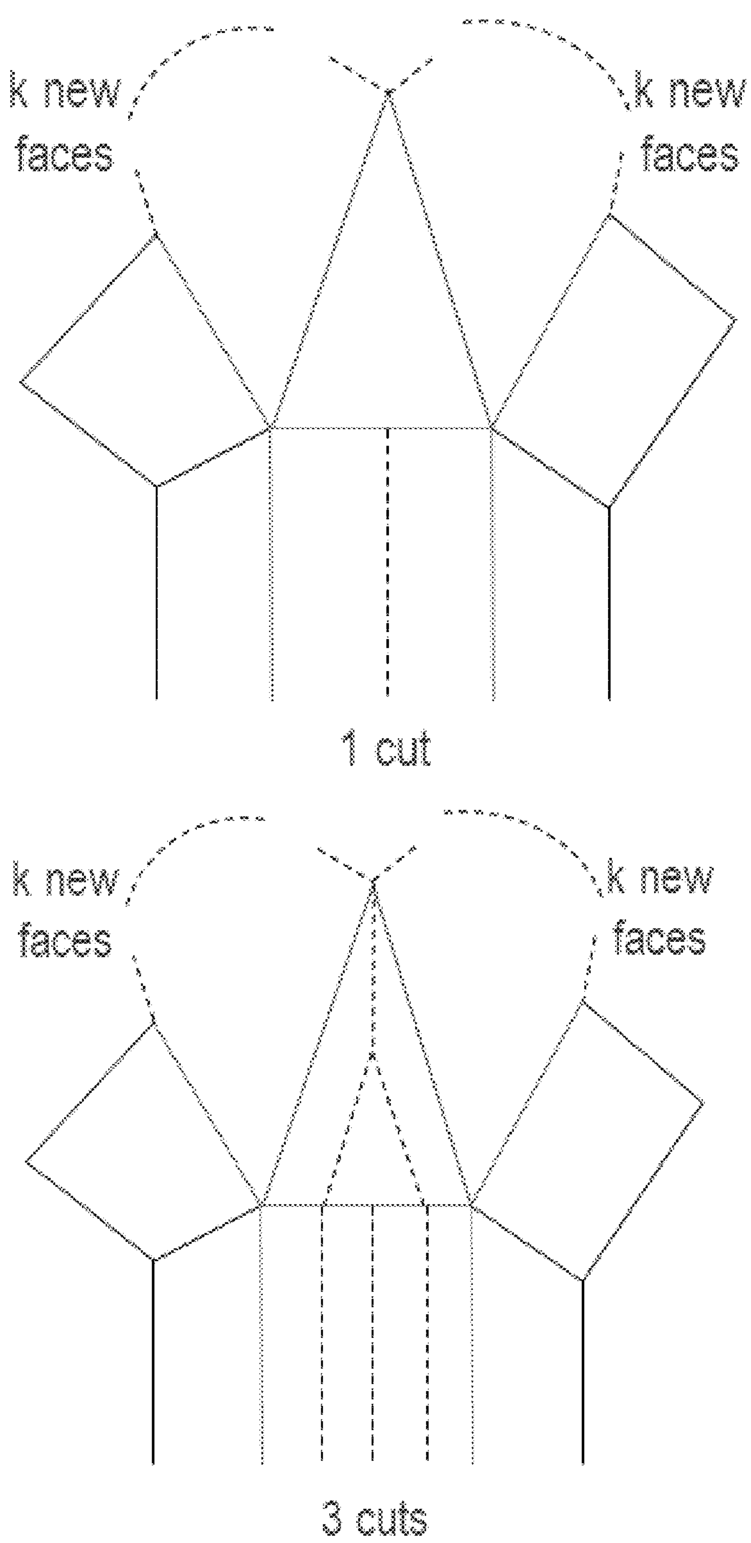

FIG. 11 illustrates the output topology for an even valence vertex and odd number of cuts. The method applies the same pattern as for the case of regular vertices. As can be seen from FIG. 11, an odd number of cuts 2N+1 will generate: N transition vertices (N−1 are regular), 2N+1 quadrangular faces. The topology of other faces is unchanged.

Figure 12:
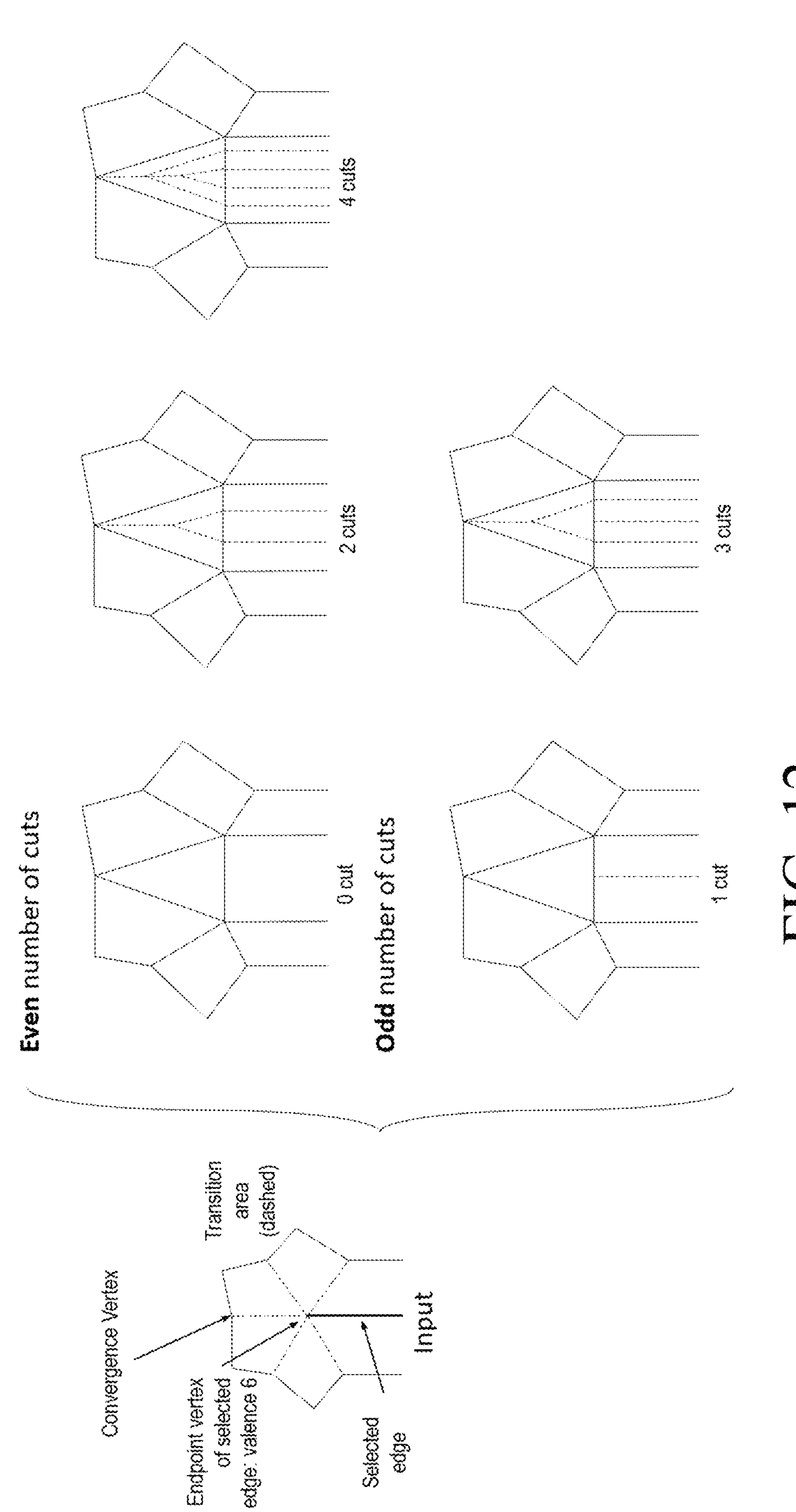

FIG. 12 Illustrates the case for a valence-6 vertex, thereby showing the scalability of the method.

2.2. Topology for an Odd Valence Vertex.

Figure 13:
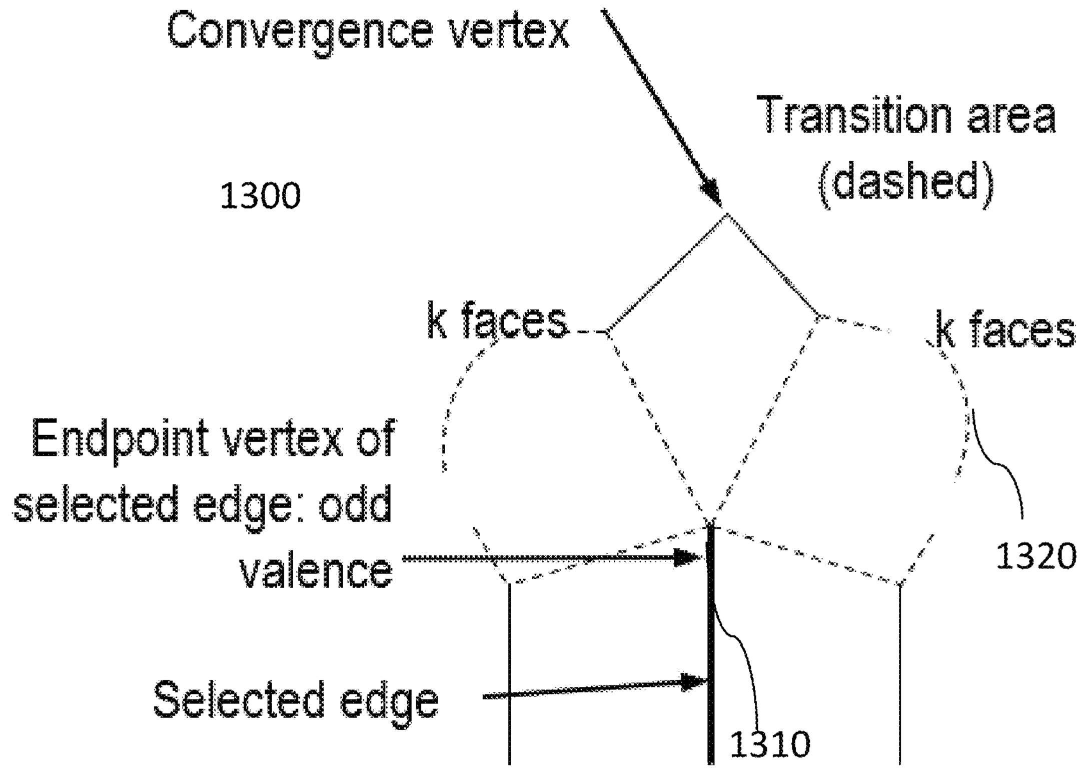

FIG. 13 illustrates an input the configuration 1300 around a vertex 1310 of odd valence. The input configuration 1300 shows odd number of faces around the vertex 1310: 2 faces sharing the last edge of the bevel, and 2*k+1 other faces in the transition area 1320. In case of odd valence the default topology will require one extra convergence vertex.

Figure 14:
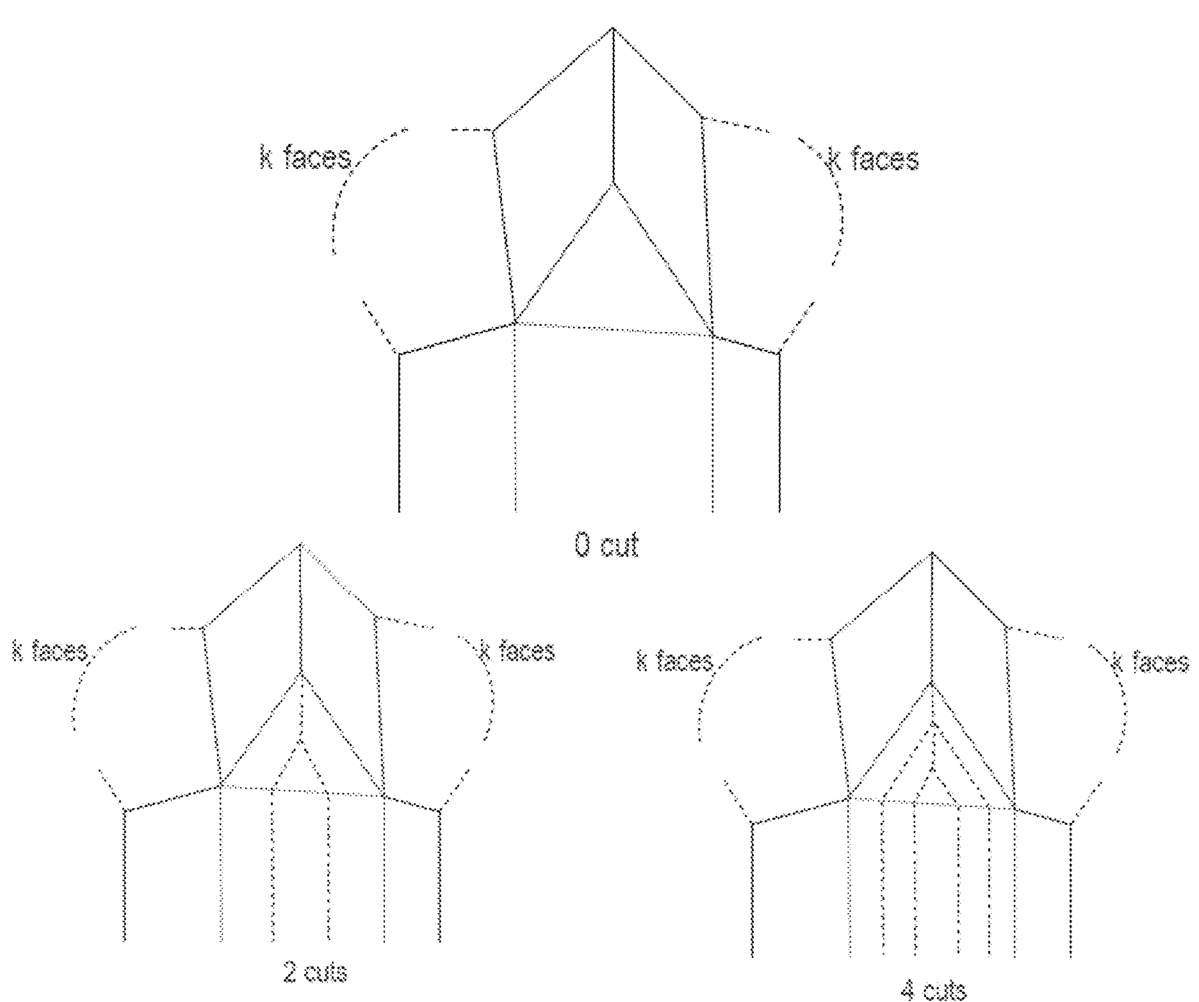

FIG. 14 illustrates the topology for an odd valence vertex and even number of cuts. A pattern similar to the one for even valence is proposed (in FIG. 14 for the case of 0 cuts, 2 cuts and 4 cuts). An even number of cuts 2N generates 1+N transition vertices (N−1 are regular), 2N+2 quadrangular faces and 1 triangular face. The topology of other faces is unchanged.

Figure 15:
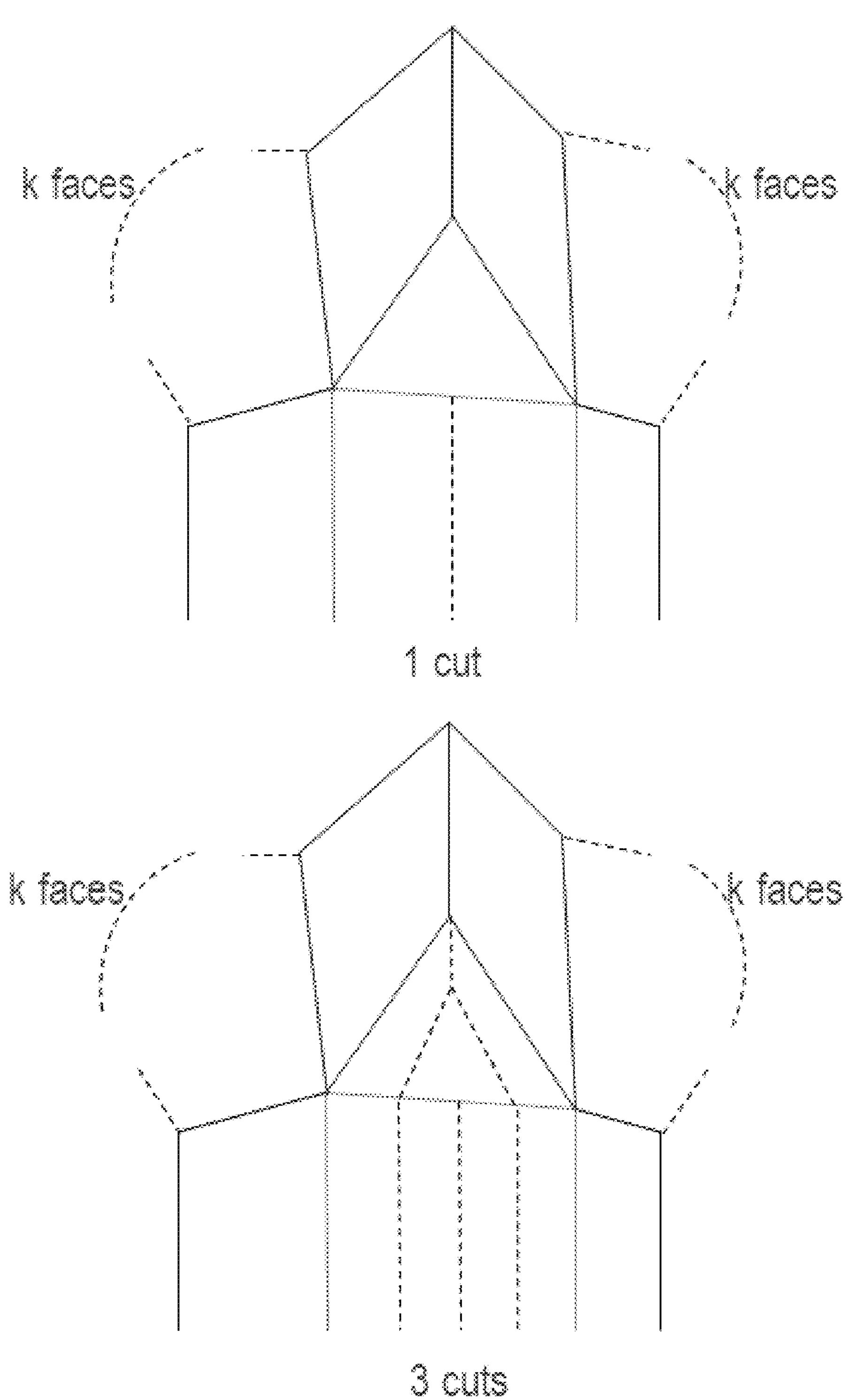

FIG. 15 illustrates the topology for an odd valence vertex and odd number of cuts. A pattern similar to the one for even valence is proposed: an odd number of cuts 2N+1 generates 1+N transition vertices (N−1 are regular), 2N+3 quadrangular faces. The topology of other faces is unchanged.

Figure 16:
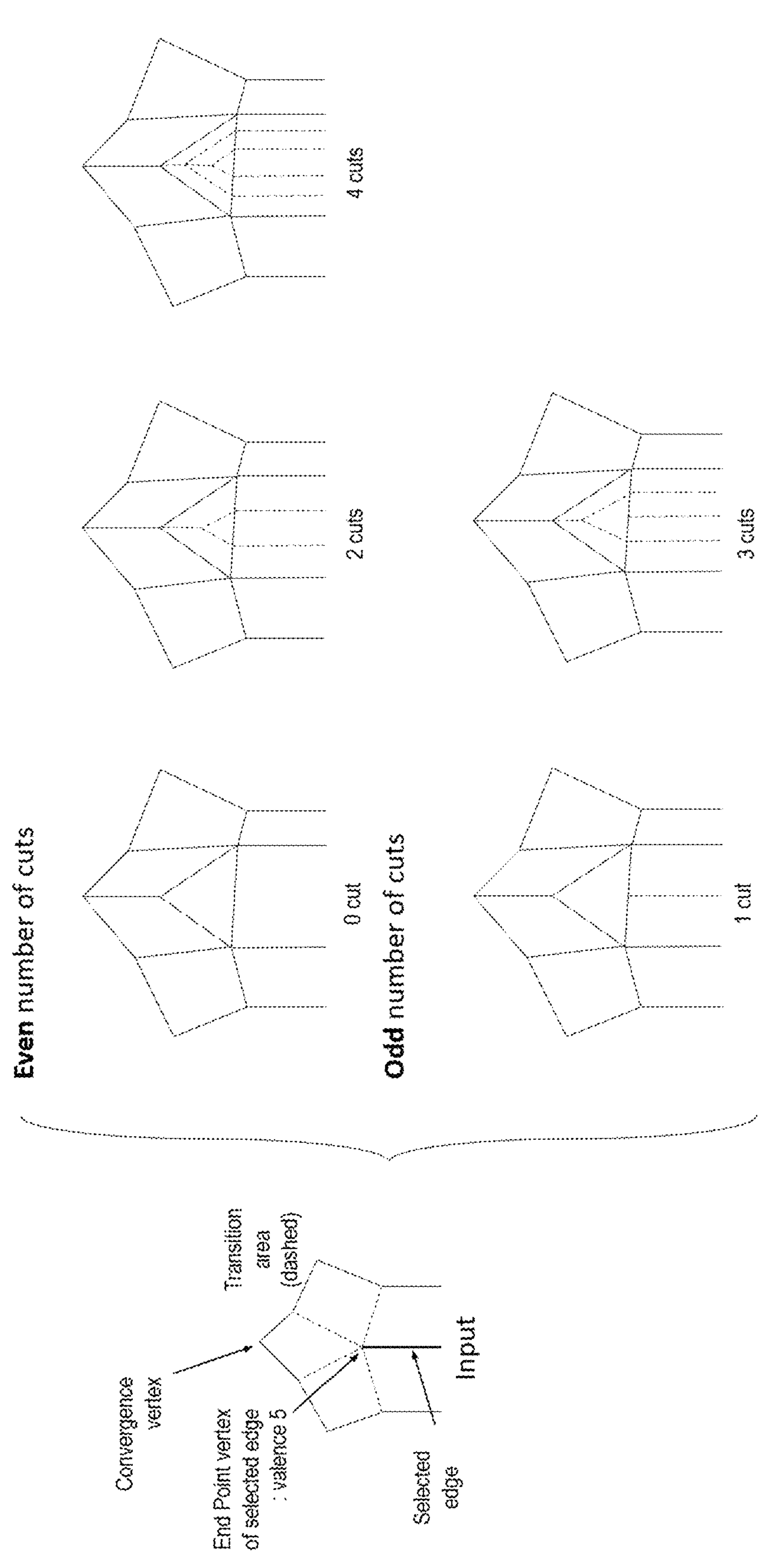

FIG. 16 Illustrates the case for a valence-5 vertex, thereby showing the scalability of the method.

3) Location of the Transition Vertices.

Not only transition vertices are the key to a good topology (quadrangular faces, low number of extraordinary vertices), they also offer more degrees of freedom to the designer by their location. They have a huge impact on the transition quality of the bevel:

they avoid all mesh-lines to converge to only one vertex;

they ensure a clean curvature transition between the incident faces of the bevel and the main shape body.

A bevel can be customized by providing a profile that will be swept along the edges. In some cases the transition area can be highly impacted since the bevel should merge into the initial body. The method provides two strategies should a designer want a local or global control on the shape. The designer may also edit the vertices manually if needed.

Positioning the transition vertices comes to positioning:

the fictive vertex: it could be global or local; and the fictive line defined by the convergence vertex and the fictive vertex.

Figure 17:
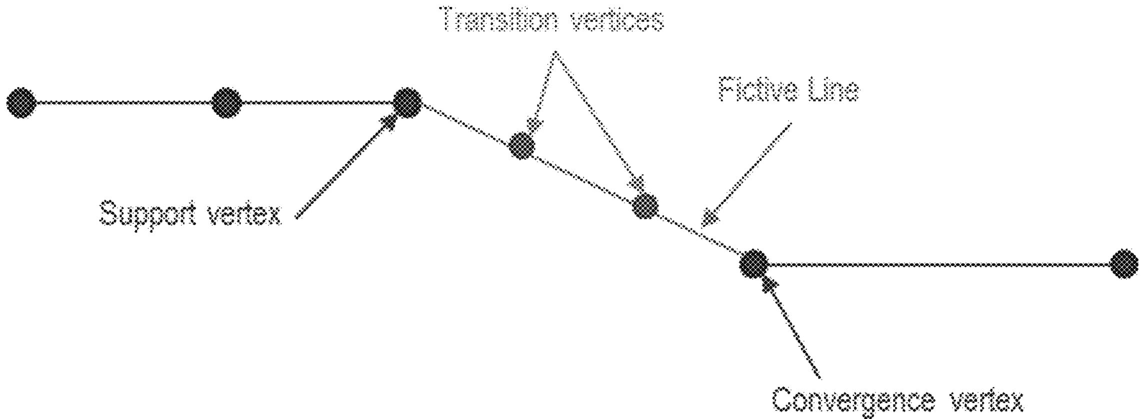

FIG. 17 shows a transversal view of a mesh, showing the location of the transition vertices and the fictive line.

Figure 18:
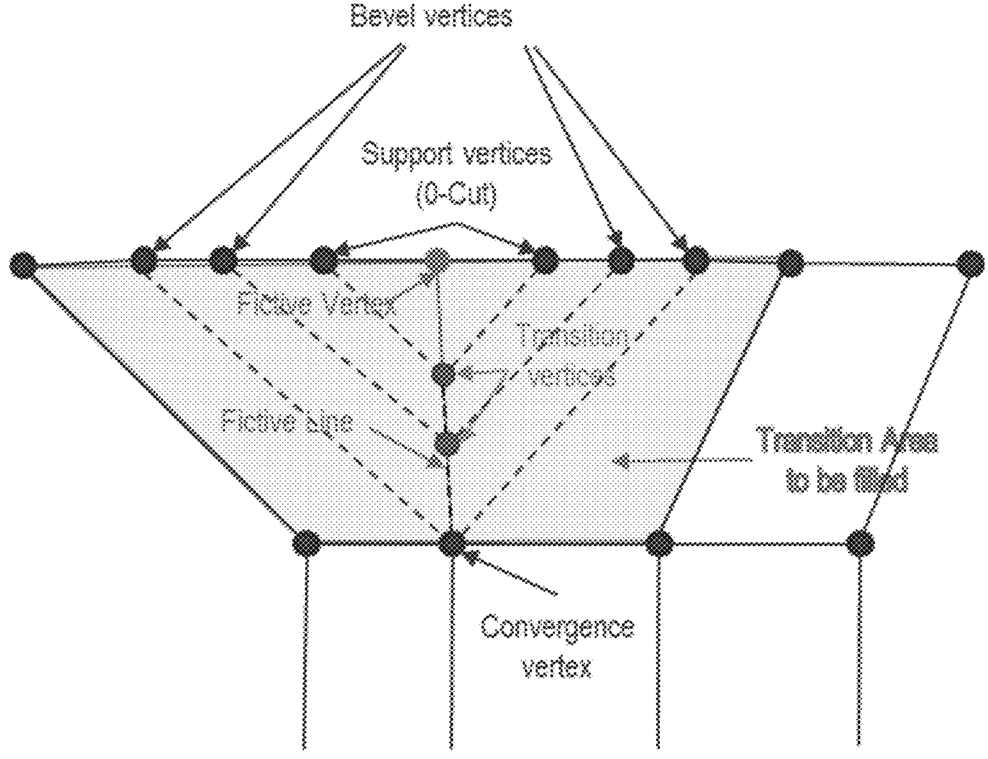

FIG. 18 shows an upper view of the placement of the transition vertices and the fictive line.

The two strategies for placing the fictive vertices are now discussed.

3.1. Global Strategy.

Figure 19:
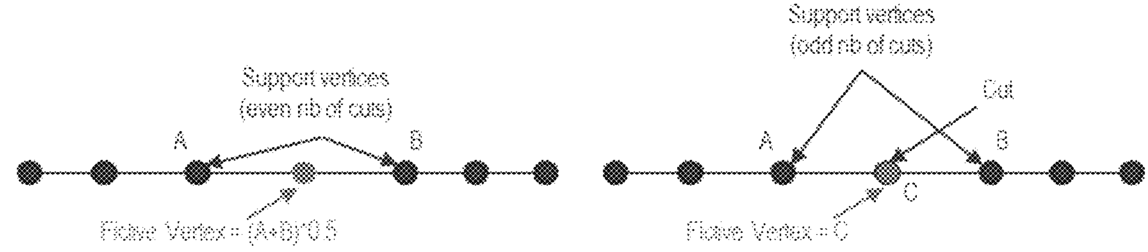
Figure 20:
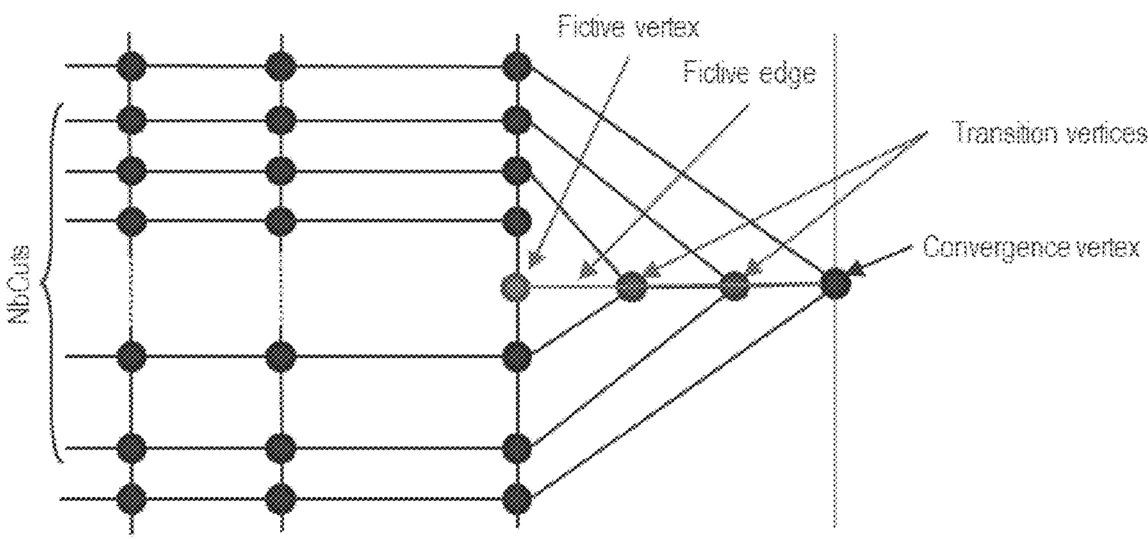

FIGS. 19 and 20 show the global strategy. This strategy allows a stable location of the transition vertices and is not linked to the bevel shape, it requires to compute one fictive vertex that will be linked to the convergence vertex by a fictive line. All transition vertices will then be constrained to lie on this line.

As shown in FIG. 19, the fictive vertex is constructed as:

the average of two middle cuts in case of an even number of cuts the location of the middle cut in case of an odd number of cuts As shown in FIG. 20, transition vertices are then evenly distributed along the fictive edge.

3.2. Local Strategy.

In this case, a fictive edge is computed for every transition vertex.

Assuming, for the sake of illustration, that the number of cuts is N, the inserted vertices can be numbered from 1 to N.

Transition vertices will be connected to vertices on both sides of the bevel, i.e. to vertices k and N−k−1.

For each pair of vertices (k, N−k−1) a fictive vertex $F_{k,N-k-1}$ is computed with the global rule: average if k≠N−k−1, k if points are the same.

Transition vertex $T_{k,N-k-1}$ is constructed on the segment [$F_{k,N-k-1}$, ConvergenceVertex] at ratio $$\frac{k}{INT\left(\frac{N}{2}\right)+1}$$

where INT is the integer part.

Figure 21:
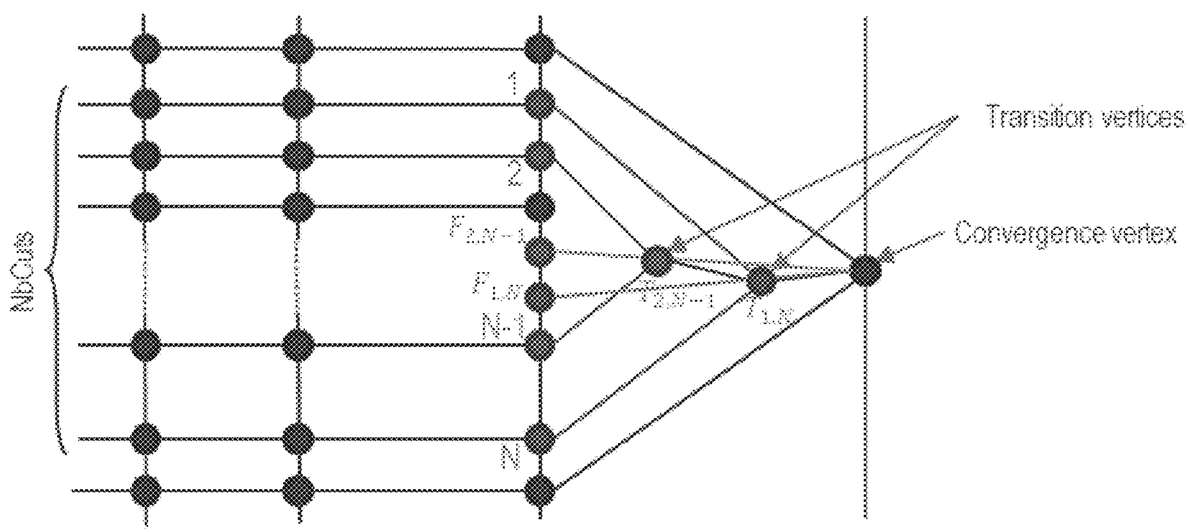

FIG. 21 illustrates the placement of transition vertices along the segments.

The invention claimed is:

1. A computer-implemented method for designing a 3D modeled object representing a manufacturing product, the method comprising:

obtaining a base mesh representing the 3D modeled object;

selecting one or more connected edges of the base mesh, thereby obtaining a path of connected edges comprising two endpoints;

subdividing the base mesh based on the path of connected edges by:

obtaining a bevel pattern area over the path by:

identifying each face of the base mesh that shares an edge of the path, subdividing each identified face of the base mesh for reaching a number p of cuts where p is a non-negative number, a cut being a face subdividing the identified face of the base being swept along at least one of the one or more connected edges sharing the identified face, when p equals zero, the identified face being subdivided by a face sweeping along the at least one of the one or more of the connected edges of the base mesh, when the p is greater than zero, the face being created at the face being subdivided by faces bounded by p edges sweeping along the face; and obtaining, for at least one of the two endpoints of the path, a transition area by grouping all faces sharing the at least one of the two endpoints of the path, except those of the bevel pattern area;

re-meshing the transition area by:

obtaining, for each cut comprising a pair of vertices, a transition vertex located in the transition area, wherein obtaining the transition vertex located in the transition area includes:

computing a fictive line that extends between:

a fictive vertex located on an edge shared by both the bevel pattern area and the transition area, and a convergence vertex that is located on one of the edges of the transition area; and placing the transition vertex located on the transition area on the fictive line, and computing an edge connecting each vertex of the pair of vertices of the cut with the obtained transition vertex; and outputting the subdivided base mesh, the subdivided base mesh being suitable for manufacturing the product.

2. The computer-implemented method of claim 1, wherein the re-meshing of the transition area comprises, when the subdividing each identified face of the base mesh comprises subdividing each identified face of the base mesh for reaching an even number 2N of cuts, and when a topology valence of the at least one of the two endpoints of the path is even, performing:

for N=0 cut, designating one of the vertices connected to the at least one of the two endpoints of the path as a convergence vertex;

for each subsequent cut, obtaining a transition vertex located in the transition area and computing an edge connecting each vertex of the pair of vertices of the subsequent cut with the obtained transition vertex; and keeping unmodified a topology of the other faces of the bevel pattern area and the transition area, thereby obtaining a re-meshed transition area comprising 2N quadrangular faces and a triangular face.

3. The computer-implemented method of claim 1, wherein the re-meshing of the transition area includes, when the subdividing each identified face of the base mesh includes subdividing each identified face of the base mesh for reaching an odd number 2N+1 of cuts, and when a topology valence of the at least one of the two endpoints of the path is even, performing:

for N=0 cut, designating one of the vertices connected to the at least one of the two endpoints of the path as a convergence vertex;

for each subsequent cut, obtaining a transition vertex located in the transition area and computing an edge connecting each vertex of the pair of vertices of the subsequent cut with the obtained transition vertex; and keeping unmodified a topology of the other faces of the bevel pattern area and the transition area, thereby obtaining a re-meshed transition area comprising 2N quadrangular faces and a triangular face.

4. The computer-implemented method of claim 1, wherein the re-meshing of the transition area includes, when the subdividing each identified face of the base mesh includes subdividing each identified face of the base mesh for reaching an even number 2N of cuts, and when a topology valence of the at least one of the two endpoints of the path is odd, performing: for N=0 cut:

identifying a first vertex and a third vertex of the transition area that are connected to the at least one of the two endpoints of the path and a second vertex that is connected to the first and third vertices, the second vertex being a convergence vertex, and obtaining a first transition vertex located in the transition area and computing an edge connecting the generated first transition vertex to the second vertex; and performing: for each subsequent cut, obtaining a transition vertex located in the transition area and computing an edge connecting each vertex of the pair of vertices of the subsequent cut with the obtained transition vertex; and keeping unmodified a topology of the other faces of the bevel pattern area and the transition area, thereby obtaining a re-meshed transition area comprising at least 2N quadrangular faces and a triangular face.

5. The computer-implemented method of claim 1, wherein the re-meshing of the transition area includes, when the subdividing each identified face of the base mesh comprises subdividing each identified face of the base mesh for reaching an odd number 2N+1 of cuts, and when a topology valence of the at least one of the two endpoints of the path is odd, performing: for N=0 cut:

identifying a first vertex and a third vertex of the transition area that are connected to the at least one of the two endpoints of the path and a second vertex that is connected to the first and third vertices, the second vertex being a convergence vertex, and obtaining a first transition vertex located in the transition area and computing an edge connecting the generated first transition vertex to the second vertex;

for each subsequent cut, obtaining a transition vertex located in the transition area and computing an edge connecting each vertex of the pair of vertices of the subsequent cut with the obtained transition vertex; and keeping unmodified a topology of the other faces of the bevel pattern area and the transition area, thereby obtaining a re-meshed transition area comprising at least 2N quadrangular faces and a triangular face.

6. The computer-implemented method of claim 1, wherein the fictive vertex is constructed as:

an average distance between a pair of vertices of a cut when an even number 2N of cuts is reached; or a location of a middle cut among the cuts when an odd number 2N+1 of cuts is reached.

7. The computer-implemented method of claim 6, wherein the placing the at least one transition of at least one vertex located on the transition on the fictive line comprises evenly placing the at least one transition of the at least one vertex on the fictive line.

8. The computer-implemented method of claim 1, further comprising, for each cut:

constructing the fictive vertex as:

an average distance between the pair of vertices of the cut, or a location of an odd cut with no pair of vertices;

computing a fictive line that extends between the fictive vertex of the cut and the convergence vertex; and placing the transition vertex on the computed fictive line.

9. The computer-implemented method of claim 8, wherein the placing, for each cut, the transition vertex on the computed fictive line comprises placing, for each pair (k, N−k−1) of vertices of a cut, the transition vertex ($T_{k, N-k-1}$) on the fictive line at a ratio k/(INT (N/2)+1), where INT is an integer part.

10. The computer-implemented method of claim 1, wherein the re-meshing the transition area further comprises computing a polyline that connects the one or more obtained transition vertices.

11. The computer-implemented method of claim 1, wherein the base mesh is a quadrangle base mesh.

12. A non-transitory computer readable medium having stored thereon a program for designing a 3D modeled object representing a manufacturing product that when executed by a computer causes the computer to implement a method comprising:

obtaining a base mesh representing the 3D modeled object;

selecting one or more connected edges of the base mesh, thereby obtaining a path of connected edges comprising two endpoints;

subdividing the base mesh based on the path of connected edges by:

obtaining a bevel pattern area over the path by:

identifying each face of the base mesh that shares an edge of the path, subdividing each identified face of the base mesh for reaching a number p of cuts where p is a non-negative number, a cut being a face subdividing the identified face of the base being swept along at least one of the one or more connected edges sharing the identified face, when p equals zero, the identified face being subdivided by a face sweeping along the at least one of the one or more of the connected edges of the base mesh, when the p is greater than zero, the face being created at the face being subdivided by faces bounded by p edges sweeping along the face; and obtaining, for at least one of the two endpoints of the path, a transition area by grouping all faces sharing the at least one of the two endpoints of the path, except those of the bevel pattern area;

re-meshing the transition area by:

obtaining, for each cut comprising a pair of vertices, a transition vertex located in the transition area, wherein obtaining the transition vertex located in the transition area includes:

computing a fictive line that extends between:

a fictive vertex located on an edge shared by both the bevel pattern area and the transition area, and a convergence vertex that is located on one of the edges of the transition area; and placing the transition vertex located on the transition area on the fictive line, and computing an edge connecting each vertex of the pair of vertices of the cut with the obtained transition vertex; and outputting the subdivided base mesh, the subdivided base mesh being suitable for manufacturing the product.

13. The non-transitory computer readable medium of claim 12, wherein the re-meshing of the transition area includes, when the subdividing each identified face of the base mesh includes subdividing each identified face of the base mesh for reaching an even number 2N of cuts or an odd number 2N+1 of cuts, and when a topology valence of the at least one of the two endpoints of the path is even, performing:

for N=0 cut, designating one of the vertices connected to the at least one of the two endpoints of the path as a convergence vertex;

for each subsequent cut, obtaining a transition vertex located in the transition area and computing an edge connecting each vertex of the pair of vertices of the subsequent cut with the obtained transition vertex; and keeping unmodified a topology of the other faces of the bevel pattern area and the transition area, thereby obtaining a re-meshed transition area comprising 2N quadrangular faces and a triangular face.

14. The non-transitory computer readable medium of claim 12, wherein the re-meshing of the transition area includes, when the subdividing each identified face of the base mesh includes subdividing each identified face of the base mesh for reaching an even number 2N of cuts, and when a topology valence of the at least one of the two endpoints of the path is odd, performing: for N=0 cut:

identifying a first vertex and a third vertex of the transition area that are connected to the at least one of the two endpoints of the path and a second vertex that is connected to the first and third vertices, the second vertex being a convergence vertex, and obtaining a first transition vertex located in the transition area and computing an edge connecting the generated first transition vertex to the second vertex; and performing: for each subsequent cut, obtaining a transition vertex located in the transition area and computing an edge connecting each vertex of the pair of vertices of the subsequent cut with the obtained transition vertex; and keeping unmodified a topology of the other faces of the bevel pattern area and the transition area, thereby obtaining a re-meshed transition area comprising at least 2N quadrangular faces and a triangular face.

15. The non-transitory computer readable medium of claim 12, wherein the re-meshing of the transition area includes, when the subdividing each identified face of the base mesh comprises subdividing each identified face of the base mesh for reaching an odd number 2N+1 of cuts, and when a topology valence of the at least one of the two endpoints of the path is odd, performing: for N=0 cut:

identifying a first vertex and a third vertex of the transition area that are connected to the at least one of the two endpoints of the path and a second vertex that is connected to the first and third vertices, the second vertex being a convergence vertex, and obtaining a first transition vertex located in the transition area and computing an edge connecting the generated first transition vertex to the second vertex;

for each subsequent cut, obtaining a transition vertex located in the transition area and computing an edge connecting each vertex of the pair of vertices of the subsequent cut with the obtained transition vertex; and keeping unmodified a topology of the other faces of the bevel pattern area and the transition area, thereby obtaining a re-meshed transition area comprising at least 2N quadrangular faces and a triangular face.

16. The non-transitory computer readable medium of claim 12, wherein the fictive vertex is constructed as:

an average distance between a pair of vertices of a cut when an even number 2N of cuts is reached; or a location of a middle cut among the cuts when an odd number 2N+1 of cuts is reached.

17. The non-transitory computer readable medium of claim 16, wherein the placing the at least one transition of at least one vertex located on the transition on the fictive line comprises evenly placing the at least one transition of the at least one vertex on the fictive line.

18. A system comprising:

a processor communicatively coupled with memory having recorded thereon a computer program for designing a 3D modeled object representing a manufacturing product that when executed by the processor causes the processor to be configured to:

obtain a base mesh representing the 3D modeled object;

select one or more connected edges of the base mesh, thereby obtaining a path of connected edges comprising two endpoints;

subdivide the base mesh based on the path of connected edges by the processor being configured to:

obtain a bevel pattern area over the path by the processor being configured to:

identify each face of the base mesh that shares an edge of the path, subdivide each identified face of the base mesh for reaching a number p of cuts where p is a non-negative number, a cut being a face subdividing the identified face of the base being swept along at least one of the one or more connected edges sharing the identified face, when p equals zero, the identified face being subdivided by a face sweeping along the at least one of the one or more of the connected edges of the base mesh, when the p is greater than zero, the face being created at the face being subdivided by faces bounded by p edges sweeping along the face; and obtain, for at least one of the two endpoints of the path, a transition area by grouping all faces sharing the at least one of the two endpoints of the path, except those of the bevel pattern area;

re-mesh the transition area by the processor being configured to:

obtain, for each cut comprising a pair of vertices, a transition vertex located in the transition area, wherein the processor being configured to obtain the transition vertex located in the transition area by being configured to:

compute a fictive line that extends between:

a fictive vertex located on an edge shared by both the bevel pattern area and the transition area, and a convergence vertex that is located on one of the edges of the transition area; and place the transition vertex located on the transition area on the fictive line, and compute an edge connecting each vertex of the pair of vertices of the cut with the obtained transition vertex; and output the subdivided base mesh.

* * * * *